United States Patent
Ashizaki

(10) Patent No.: US 6,814,509 B2
(45) Date of Patent: Nov. 9, 2004

(54) IMAGE PRINTING ORDER RECEIVING SYSTEM AND IMAGE PRINTING ORDER RECEIVING METHOD

(75) Inventor: Koji Ashizaki, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/398,105

(22) PCT Filed: Oct. 18, 2001

(86) PCT No.: PCT/JP01/09158

§ 371 (c)(1),
(2), (4) Date: Jul. 17, 2003

(87) PCT Pub. No.: WO02/33956

PCT Pub. Date: Apr. 25, 2002

(65) Prior Publication Data

US 2004/0021898 A1 Feb. 5, 2004

(30) Foreign Application Priority Data

Oct. 19, 2000 (JP) ....................................... 2000-319774

(51) Int. Cl.⁷ .............................. B41J 5/30; H04N 1/00; H04N 1/04
(52) U.S. Cl. .......................... 400/61; 358/408; 358/487
(58) Field of Search ........................... 400/76; 358/440, 358/408, 487, 211.3, 527; 354/327; 705/1, 26, 27

(56) References Cited

U.S. PATENT DOCUMENTS

| | | | | |
|---|---|---|---|---|
| 5,159,385 A | * | 10/1992 | Imamura | 355/28 |
| 5,666,215 A | * | 9/1997 | Fredlund et al. | 358/487 |
| 5,949,551 A | * | 9/1999 | Miller et al. | 358/408 |
| 5,974,401 A | * | 10/1999 | Enomoto et al. | 705/40 |
| 6,011,547 A | * | 1/2000 | Shiota et al. | 382/254 |
| 6,017,157 A | * | 1/2000 | Garfinkle et al. | 396/639 |
| 6,157,435 A | * | 12/2000 | Slater et al. | 355/40 |
| 6,222,646 B1 | * | 4/2001 | Maurinus et al. | 358/440 |
| 6,301,607 B2 | * | 10/2001 | Barraclough et al. | 709/204 |
| 6,324,521 B1 | * | 11/2001 | Shiota et al. | 705/27 |
| 6,337,712 B1 | * | 1/2002 | Shiota et al. | 348/231.1 |
| 6,353,848 B1 | * | 3/2002 | Morris | 709/203 |
| 6,388,732 B1 | * | 5/2002 | Williams et al. | 355/40 |
| 6,535,228 B1 | * | 3/2003 | Bandaru et al. | 345/752 |
| 6,571,271 B1 | * | 5/2003 | Savitzky et al. | 709/200 |

FOREIGN PATENT DOCUMENTS

| | | | | |
|---|---|---|---|---|
| EP | 1107534 | 6/2001 | | H04L/29/06 |
| EP | 1133143 | 9/2001 | | H04N/1/00 |

* cited by examiner

Primary Examiner—Andrew H. Hirshfeld
Assistant Examiner—Wasseem H. Hamdan
(74) Attorney, Agent, or Firm—Jay H. Maioli

(57) ABSTRACT

In a print order receiving system, a first output receiving server receives an order to print all captured image data obtained by imaging apparatus, an image storing server stores the captured image data, a first print-out apparatus prints out the initial printed matter, and the first print-out apparatus supplies the initial printed matter to a shipping terminal. An order receiving server receives a reorder of the printed matter from a user terminal, a charging and settlement server performs the charging and settlement of the printed matter, the first print-out apparatus prints the image data to generate later printed matter when a reorder is received, and the first print-out apparatus supplies the later printed matter to the shipping terminal.

2 Claims, 22 Drawing Sheets

FIG.2

| IMAGING NUMBER (ORDER NUMBER) | PASSWORD | IMAGING DATE (ORDER DATE) | ORDER OUTPUT TYPE | ORDERED SIZE | ORDERED QUANTITY | ADDRESSEE'S NAME | ADDRESSEE'S ADDRESS | CAPTURED IMAGE DATA | FOREGROUND IMAGE DATA | BACKGROUND IMAGE DATA |
|---|---|---|---|---|---|---|---|---|---|---|
| JPCAM 001 | 468ace02 | 2000/01/01 14:00:15 | COLOR | L | 1 | ○○○○ | ○○○○, TOKYO | (IMAGE DATA) | JPFR 001 | JPBK 002 |
| JPCAM 002 | 97531fdb | 2000/01/01 14:10:40 | MONOCHROME | S | 4 | ×××× | ××××, TOKYO | (IMAGE DATA) | JPFR 001 | JPBK 001 |
| | | | | | | | | | | |

FIG.3

| IMAGING NUMBER (ORDER NUMBER) | PASSWORD | IMAGING DATE (ORDER DATE) | ORDER OUTPUT TYPE | ORDERED SIZE | ORDERED QUANTITY | ADDRESSEE'S NAME | ADDRESSEE'S ADDRESS | CAPTURED IMAGE DATA | FOREGROUND IMAGE DATA | BACKGROUND IMAGE DATA |
|---|---|---|---|---|---|---|---|---|---|---|
| JPCAM 001 | 468ace02 | 2000/01/01 14:00:15 | COLOR | L | 1 | ○○○○ | ○○○○, TOKYO | JPCAM 001 | JPFR 001 | JPBK 002 |
| JPCAM 002 | 97531fdb | 2000/01/01 14:10:40 | MONOCHROME | S | 4 | ×××× | ××××, TOKYO | JPCAM 002 | JPFR 001 | JPBK 001 |
| JPNET 001 | 94628462 | 2000/01/03 21:00:15 | COLOR | L | 10 | △△△△ | △△△△, TOKYO | JPCAM 002 | JPFR 002 | JPBK 001 |
| JPNET 002 | 372867742 | 2000/01/15 08:40:15 | MONOCHROME | S | 1 | □□□□ | □□□□, TOKYO | JPCAM 001 | JPFR 002 | JPBK 001 |

FIG.4

| IMAGE NUMBER (IMAGING OR ORDER NUMBER) | PASSWORD | REGISTERED DATE (IMAGING OR ORDERED DATE) | IMAGE DATA |
|---|---|---|---|
| JPFR001 | | 1999/12/30 23:00:20 | (IMAGE DATA) |
| JPFR002 | | 1999/12/31 05:37:05 | (IMAGE DATA) |
| JPBK001 | | 1999/12/31 10:35:00 | (IMAGE DATA) |
| JPBK002 | | 1999/12/31 16:50:55 | (IMAGE DATA) |
| JPCAM001 | 468ace02 | 2000/01/01 14:00:15 | (IMAGE DATA) |
| JPCAM002 | 97531fdb | 2000/01/01 14:10:40 | (IMAGE DATA) |

FIG.5

| CHARGING NUMBER | CHARGING DATE | CHARGED AMOUNT (ORDER PRICE) | PAYMENT METHOD | FINANCIAL INSTITUTION NAME | CREDIT CARD NUMBER OR ACCOUNT NUMBER | SETTLEMENT STATUS |
|---|---|---|---|---|---|---|
| JPPAY 800 | 2000/01/03 21:00:15 | 20000 YEN | CREDIT CARD | ++++ CREDIT Co. | 7890-1234 | PAYMENT PENDING |
| JPPAY 801 | 2000/01/15 08:40:15 | 1000 YEN | BANK ACCOUNT | BANK NAME | 653-56789 | PAYMENT RECEIVED |

FIG.6

| IMAGING NUMBER (ORDER NUMBER) | PASSWORD | IMAGING DATE (ORDER DATE) | ORDER OUTPUT TYPE | ORDERED SIZE | ORDERED QUANTITY | ORDERED PRICE | CHARGING NUMBER | ADDRESSEE'S NAME | ADDRESSEE'S ADDRESS | CAPTURED IMAGE DATA | FOREGROUND IMAGE DATA | BACKGROUND IMAGE DATA |
|---|---|---|---|---|---|---|---|---|---|---|---|---|
| JPCAM 001 | 468ace02 | 2000/01/01 14:00:15 | COLOR | L | 1 | | | ○○○○ | ○○○○, TOKYO | JPCAM 001 | JPFR 001 | JPBK 002 |
| JPCAM 002 | 97531fdb | 2000/01/01 14:10:40 | MONO-CHROME | S | 4 | | | ××××  | ××××, TOKYO | JPCAM 002 | JPFR 001 | JPBK 001 |
| JPNET 001 | 94628462 | 2000/01/03 21:00:15 | COLOR | L | 10 | 20000 YEN | JPPAY 800 | △△△△ | △△△△, TOKYO | JPCAM 002 | JPFR 002 | JPBK 001 |
| JPNET 002 | 37286742 | 2000/01/15 08:40:15 | MONO-CHROME | S | 1 | 1000 YEN | JPPAY 801 | □□□□ | □□□□, TOKYO | JPCAM 001 | JPFR 002 | JPBK 001 |
| | | | | | | | | | | | | |

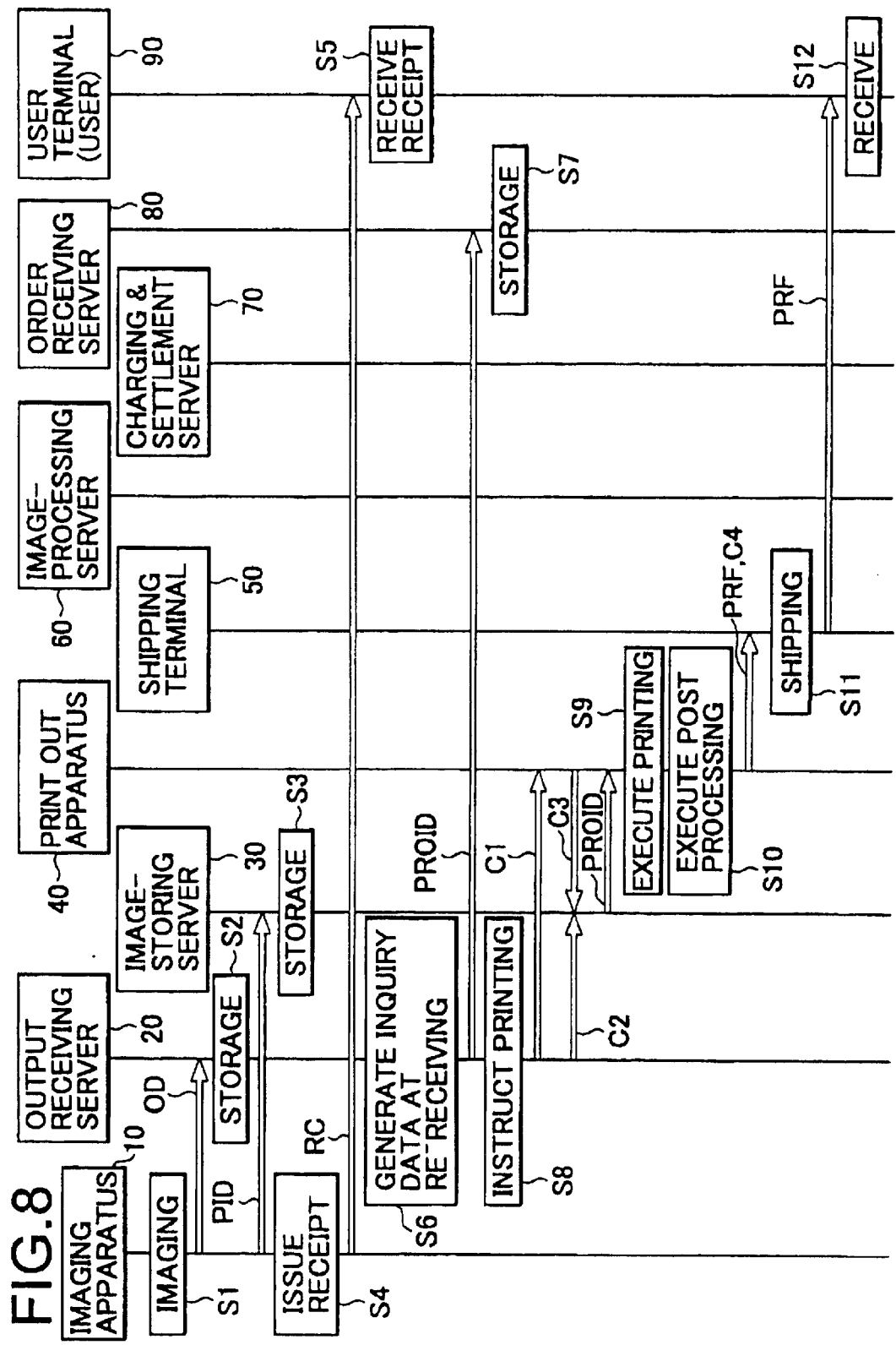

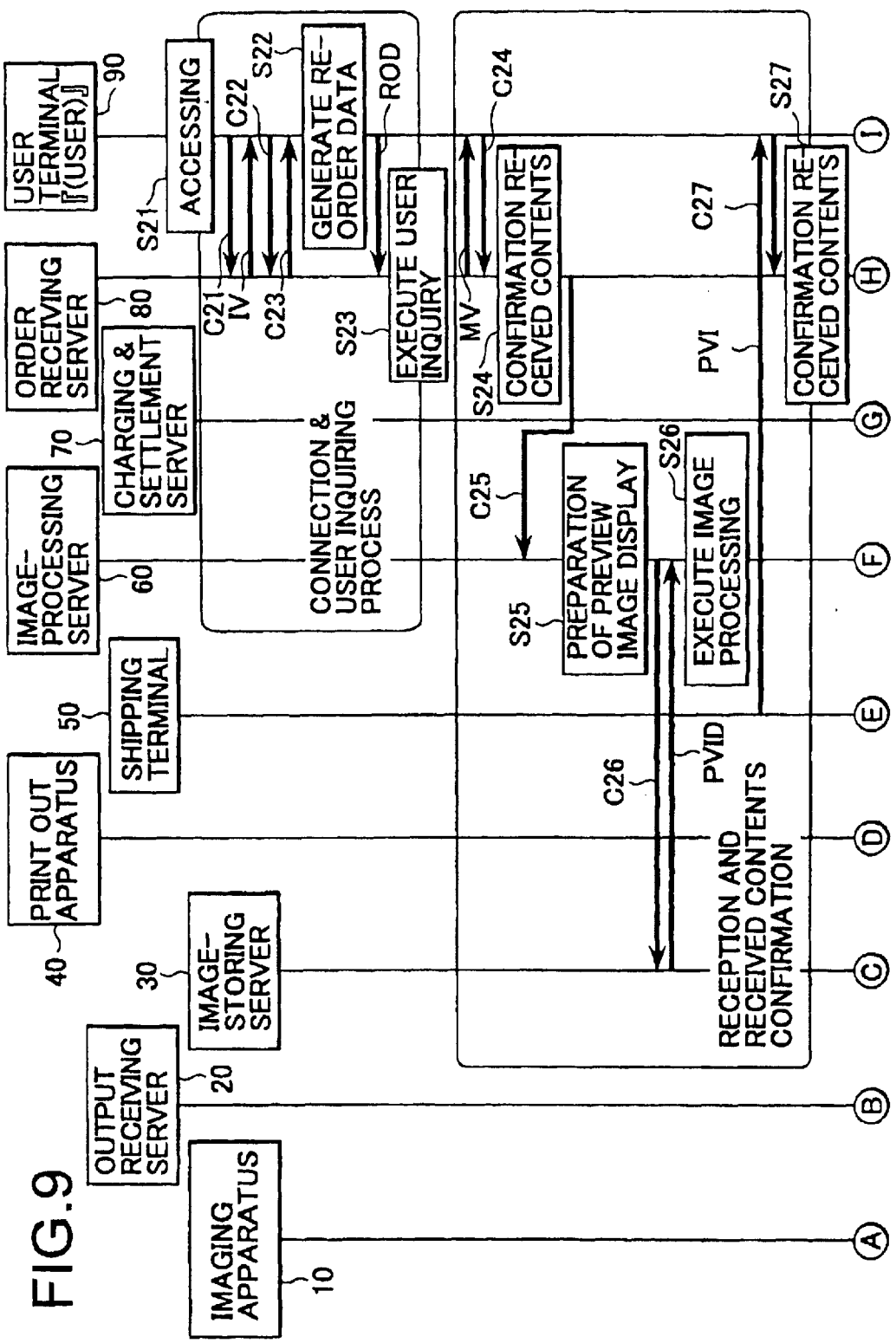

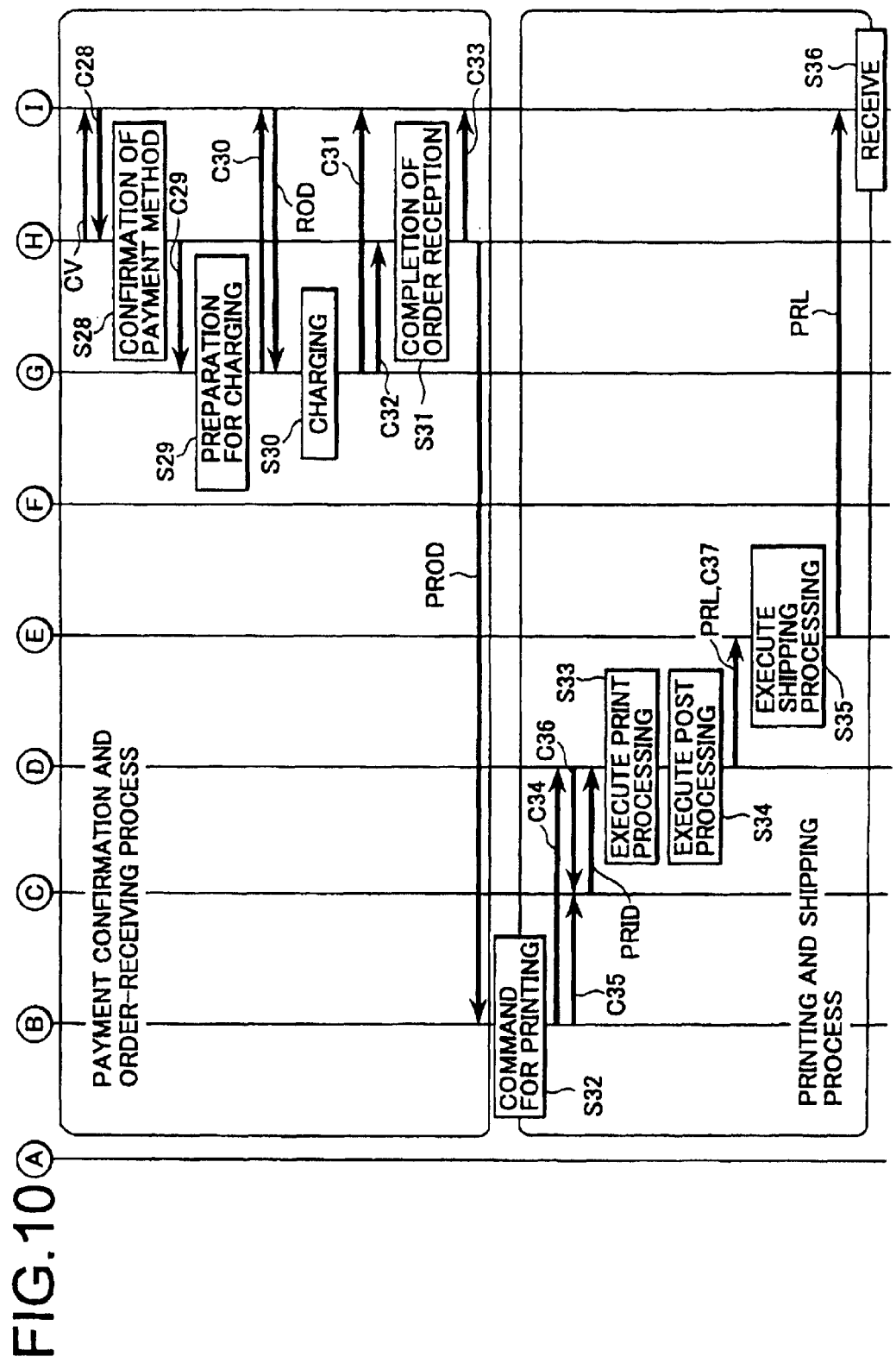

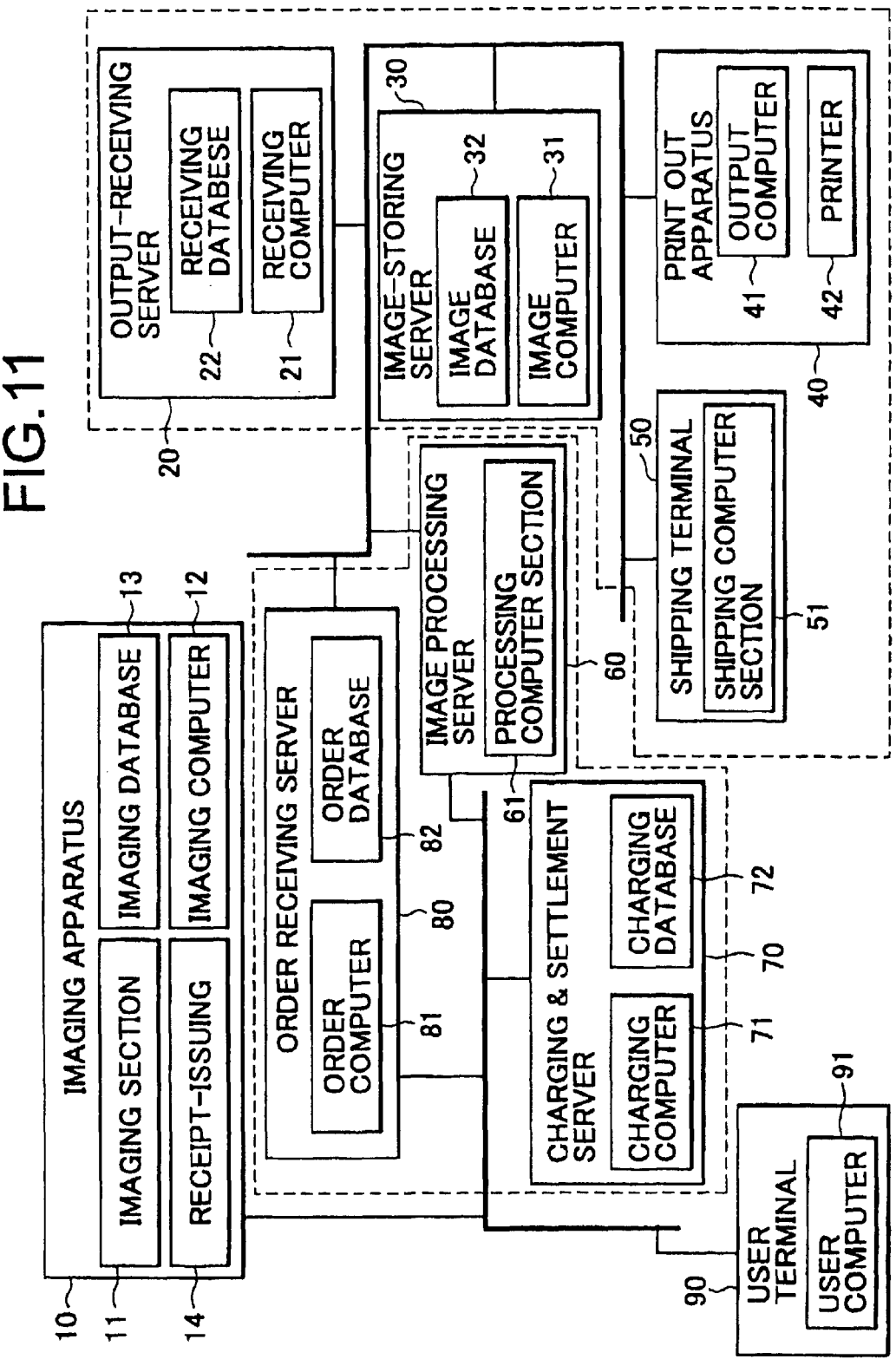

FIG.12

| IMAGING NUMBER (ORDER NUMBER) | PASSWORD | IMAGING DATE (ORDER DATE) | ORDER OUTPUT TYPE | ORDERED SIZE | ORDERED QUANTITY | ORDERED PRICE | CHARGING NUMBER | ADDRESSEE'S NAME | ADDRESSEE'S ADDRESS | CAPTURED IMAGE DATA | FOREGROUND IMAGE DATA | BACKGROUND IMAGE DATA |
|---|---|---|---|---|---|---|---|---|---|---|---|---|
| JPCAM 001 | 468ace02 | 2000/01/01 14:00:15 | COLOR | L | 1 | 2000 YEN | | ○○○○ | ○○○○, TOKYO | JPCAM 001 | JPFR 001 | JPBK 002 |
| JPCAM 002 | 97531fdb | 2000/01/01 14:10:40 | MONO-CHROME | S | 4 | 4000 YEN | | ×××× | ××××, TOKYO | JPCAM 002 | JPFR 001 | JPBK 001 |
| JPNET 001 | 94628462 | 2000/01/03 21:00:15 | COLOR | L | 10 | 20000 YEN | JPPAY 800 | △△△△ | △△△△, TOKYO | JPCAM 002 | JPFR 002 | JPBK 001 |
| JPNET 002 | 37286742 | 2000/01/15 08:40:15 | MONO-CHROME | S | 1 | 1000 YEN | JPPAY 801 | □□□□ | □□□□, TOKYO | JPCAM 001 | JPFR 002 | JPBK 001 |
| | | | | | | | | | | | | |

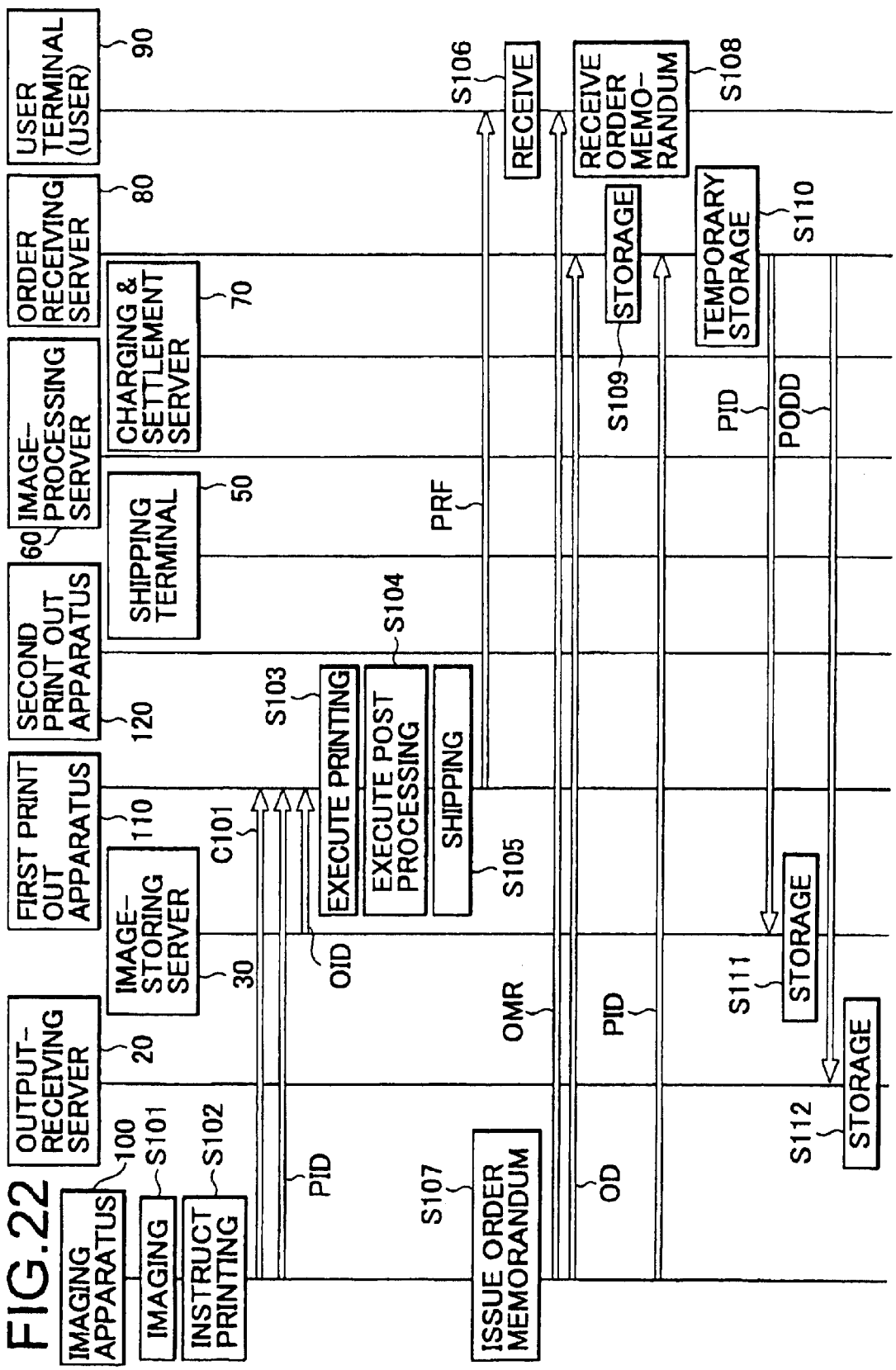

US 6,814,509 B2

IMAGE PRINTING ORDER RECEIVING SYSTEM AND IMAGE PRINTING ORDER RECEIVING METHOD

CROSS REFERENCE TO RELATED APPLICATION

This application claims priority to Japanese Patent Application No. JP 2000-319774, the disclosure thereof being herein incorporated herein by reference to the extent permitted by law.

TECHNICAL FIELD

The present invention relates to a print order receiving system and a method for receiving an order for image printing, both being for receiving an order for the service of supplying the printed matter of an image obtained by imaging. In particular, the present invention relates to a print order receiving system and a method for receiving an order for image printing, both performing the reception of an order through a network.

BACKGROUND ART

Recently, a system capable of supplying a service from the imaging of an object to the printing of a result of the imaging at the same place, like, for example, a picture print supplying apparatus disclosed in Japanese Publication for Registered Utility Model No. 3014733 has become popular.

Moreover, in recent years, a system for imaging and printing not only a static image but also a motion picture or a parallax image has been developed. Thereby, printed matter in which a viewed image can be changed in accordance with the changes of a viewing direction can be obtained.

As an example of the development of such business, business for making a parallax image picture as printed matter by utilizing a lenticular technique exists. For example, the following can be cited.

(1) "Torikkiri Konika 3D®" being a film with a three-eye type lens by Konica Corporation and the printing service thereof.
(2) "Kodak Snap Kids 3D®" being a film with a three-eye type lens by Eastman Kodak Company and the printing service thereof.
(3) "Motion Image Print (MIP) Card", which was developed by Matsushita Electric Industrial Co., Ltd. and synthesizes 6 sheets of images, and a apparatus for making the card, "Ugoitaro®".
(4) A service by Chikyuya Co., Ltd. that receives an order of a card to be made with the aforesaid "Ugoitaro®" through the so-called Internet.
(5) A sale of an amusement apparatus for business use after receiving an order by Matsushita Electric Industrial Co., Ltd., which is a vending machine of a motion picture card supplying sequence pictures made by imaging an object as a card in which the object can be viewed as if it moves according to angles of viewing.

Moreover, as a similar system, there is a technique for making printed matter by utilizing a holography technique. For example, the techniques disclosed in the following documents can be cited as such a technique.

(6) Akira Shirakura, Nobuhiro Kibara and Shigeyuki Baba, "Instant Holographic Portrait Printing System", Proceeding of SPIE, Vol. 3293, pp. 246–253, January 1998.
(7) Kihara, Shirokura, Baba, "High Speed Hologram Portrait Printing System", Three-Dimensional Image Conference 1998, July in 1998.

These documents disclose systems for supplying a service from the imaging of an object to the printing of a result of the imaging at the same place.

DISCLOSURE OF THE INVENTION

A user, who wish to use the aforesaid system or a system providing a service including steps starting from the imaging of an object to the printing of a result of the imaging at the same place, still have to go to a place where such system is operated for imaging and obtaining the printed matter thereof. Furthermore, in such systems, there is no means for obtaining additional copy of printed matter in the future.

For such reasons, the user may feel inconvenience to use the system, and the other convenient features provided by the systems may not appeal to the user anymore.

However, in order to increase the sales volume of such systems, it is necessary to increase the number of business operation sites. Moreover, there is also the following problem. When the number of operation sites in the systems has been increased more, the initial cost to be invested to start the business increases further. Accordingly, it may take a longer period of time to collect cost of the systems if the number of users per a unit period are not enough and if the operation efficiency of the systems is not kept in a higher level. Since the system for printing a motion picture and a parallax image is at their developing stages, the cost of the apparatus in the system is very high and the necessity of evading the aforesaid problems is very important.

The present invention was made under consideration of above-cited conditions. It is desired to provide a system for receiving an order of printing an image and a method for receiving an order of printing an image, both being capable of providing both of a user and an business operator with superior facilities, which enable the user to reorder printed matter based on the imaging data previously obtained and enable the business operator to increase the operation efficiency of the system.

A print order receiving system according to an embodiment of the present invention comprises: a plurality of imaging apparatus for imaging an object; a first order receiving apparatus connected with the plural imaging apparatus through a first network, the first order receiving apparatus receiving an order of a print output at captured image data obtained through the imaging of the object, the imaging being performed by each of the plural imaging apparatus; an image storing apparatus connected with the plural imaging apparatus through the first network, the image storing apparatus storing image data including the captured image data supplied from each of the plural imaging apparatus through the first network; a first print out apparatus connected with the plural imaging apparatus through the first network, the first print out apparatus printing the image data including at least the captured image data supplied from the image storing apparatus through the first network to output initial printed matter; and a shipping terminal connected with the plural imaging apparatus through the first network, the shipping terminal executing shipping processing of the initial printed matter in correspondence with each captured image data.

When this print order receiving system according to the embodiment of the invention receives an order of the print output of the image data including at least the captured image data obtained by the plural imaging apparatus with the first order receiving apparatus, the system stores the captured image data in the image storing apparatus through the first network; the system then prints the image data including at least the captured image data with the first print out apparatus to generate the initial printed matter; and then the system ships the initial printed matter to deliver the initial printed matter to a user.

Moreover, a method for receiving an order for image printing according to an embodiment of the invention comprises the steps of: imaging objects by a plurality of imaging apparatus; receiving an order of a print output by a first order receiving apparatus, connected with the plural imaging apparatus through a first network, at captured image data obtained by the imaging of the object, the imaging being performed by each of the plural imaging apparatus; storing image data including the captured image data supplied from each of the plural imaging apparatus through the first network by an image storing apparatus connected with the plural imaging apparatus through the first network; printing the image data including at least the captured image data supplied from the image storing apparatus through the first network to output initial printed matter by a first print out apparatus connected with the plural imaging apparatus through the first network; and shipping the initial printed matter in correspondence with the captured image data by a shipping terminal connected with the plural imaging apparatus through the first network.

When this method for receiving an order for image printing according to the embodiment of the invention receives an order of the print output of the image data including at least the captured image data obtained by the plural imaging apparatus with the first order receiving apparatus, in the method, the captured image data is stored in the image storing apparatus through the first network; then the image data including at least the captured image data is printed by the first print out apparatus to generate the initial printed matter; and then the initial printed matter is shipped to deliver the initial printed matter to a user.

Moreover, a print order receiving system according to an embodiment of the invention comprises: a plurality of imaging apparatus for imaging an object; a second order receiving apparatus connected with the plural imaging apparatus through a first network, the second order receiving apparatus being supplied with captured image data obtained by imaging of the object by each of the plural imaging apparatus from each of the plural imaging apparatus through the first network, the second order receiving apparatus receiving an order of a print output of each of the captured image data, the second order receiving apparatus temporarily stores the captured image data at each order; an image storing apparatus connected with the second order receiving apparatus through a second network that is different from the first network, the image storing apparatus storing image data including the captured image data supplied from the second order receiving apparatus through the second network; a first order receiving apparatus connected with the second order receiving apparatus through the second network, the first order receiving apparatus receiving an order of the print output at captured image data temporarily stored in the second order receiving apparatus; a first print out apparatus connected with the second order receiving apparatus through the second network, the first print out apparatus printing the image data including at least the captured image data supplied from the image storing apparatus through the second network to output initial printed matter; and a shipping terminal connected with the second order receiving apparatus through the second network, the shipping terminal executing shipping processing of the initial printed matter in correspondence with each captured image data.

When this print order receiving system according to the embodiment of the invention receives an order of the print output of the image data including at least the captured image data obtained by the plural imaging apparatus with the second order receiving apparatus, the system stores the captured image data in the image storing apparatus through the second network; the system then prints the image data including at least the captured image data with the first print out apparatus to generate the initial printed matter after the system receives the order finally with the first order receiving apparatus; and then the system ships the initial printed matter to deliver the initial printed matter to a user.

Moreover, a method for receiving an order for image printing according to an embodiment of the invention comprises the steps of: imaging objects by a plurality of imaging apparatus; supplying captured image data from each of the plural imaging apparatus to a second order receiving apparatus through a first network, the captured image data having been obtained by imaging of the object by each of the plural imaging apparatus, the second order receiving apparatus being connected with the plural imaging apparatus through the first network; receiving an order of a print output by the second order receiving apparatus at every captured image data; storing the captured image data temporarily at every order by the second order receiving apparatus; storing image data including the captured image data supplied from the second order receiving apparatus through a second network different from the first network by an image storing apparatus connected with the second order receiving apparatus through the second network; receiving an order of the print output at each of the captured image data temporarily stored in the second order receiving apparatus by a first order receiving apparatus connected with the second order receiving apparatus through the second network; printing the image data including at least the captured image data supplied from the image storing apparatus through the second network to output initial printed matter by a first print out apparatus connected with the second order receiving apparatus through the second network; and shipping the initial printed matter in correspondence with each of the captured image data by a shipping terminal connected with the second order receiving apparatus through the second network.

When this method for receiving an order for image printing according to the embodiment of the invention receives an order of the print output of the image data including at least the captured image data obtained by the plural imaging apparatus with the second order receiving apparatus, in the method, the captured image data is stored in the image storing apparatus through the second network; then the image data including at least the captured image data is printed by the first print out apparatus to generate the initial printed matter after the order is finally received with the first order receiving apparatus; and then the initial printed matter is shipped to deliver to a user.

Moreover, a print order receiving system according to an embodiment of the invention comprises: a plurality of imaging apparatus for imaging an object; a first order receiving apparatus connected with the plural imaging apparatus through a first network, the first order receiving apparatus receiving an order of a print output at captured image data obtained by imaging of the object, the imaging being performed by each of the plural imaging apparatus; an image storing apparatus connected with the plural imaging apparatus through the first network, the image storing apparatus storing image data including the captured image data supplied from each of the plural imaging apparatus through the first network; and a first print out apparatus connected with the plural imaging apparatus through the first network, the first print out apparatus printing the captured image data supplied from the imaging apparatus through the first network and the image data supplied from the image storing apparatus through the first network to output initial printed matter.

When this print order receiving system according to the embodiment of the invention receives an order of the print output of the image data including at least the captured image data obtained by the plural imaging apparatus with the first order receiving apparatus, the system stores the captured image data in the image storing apparatus through the first network; the system then prints the captured image data supplied from the imaging apparatus and the image data supplied from the image storing apparatus with the first print out apparatus to generate the initial printed matter; and then the initial printed matter is delivered to a user on the spot.

Moreover, a method for receiving an order for image printing according to an embodiment of the invention comprises the steps of: imaging objects by a plurality of imaging apparatus; receiving an order of a print output by a first order receiving apparatus, connected with the plural imaging apparatus through a first network, at captured image data obtained by imaging of the object, the imaging being performed by each of the plural imaging apparatus; storing image data including the captured image data supplied from each of the plural imaging apparatus through the first network by an image storing apparatus connected with the plural imaging apparatus through the first network; and printing the captured image data supplied from the imaging apparatus through the first network and the image data supplied from the image storing apparatus through the first network to output initial printed matter by a first print out apparatus connected with the plural imaging apparatus through the first network.

When this method for receiving an order for image printing according to the embodiment of the invention receives an order of the print output of the image data including at least the captured image data obtained by the plural imaging apparatus with the first order receiving apparatus, in the method, the captured image data is stored in the image storing apparatus through the first network; then the captured image data supplied from the imaging apparatus and the image data supplied from the image storing apparatus are printed by the first print out apparatus to generate the initial printed matter; and then the initial printed matter is delivered to a user on the spot.

Moreover, a print order receiving system according to an embodiment of the invention comprises: a plurality of imaging apparatus for imaging an object; a second order receiving apparatus connected with the plural imaging apparatus through a first network, the second order receiving apparatus being supplied with captured image data obtained by imaging of the object by the plural imaging apparatus from each of the plural imaging apparatus through the first network, the second order receiving apparatus receiving an order of a print output of each of the captured image data, the second order receiving apparatus temporarily stores the captured image data at each order; an image storing apparatus connected with the second order receiving apparatus through a second network that is different from the first network, the image storing apparatus storing image data including the captured image data supplied from the second order receiving apparatus through the second network; a first order receiving apparatus connected with the second order receiving apparatus through the second network, the first order receiving apparatus receiving an order of the print output at every captured image data temporarily stored in the second order receiving apparatus; and a first print out apparatus connected with the plural imaging apparatus through the second network, the first print out apparatus printing the captured image data supplied from the imaging apparatus through the second network and the image data supplied from the image storing apparatus through the second network to output initial printed matter.

This print order receiving system according to the embodiment of the invention prints the captured image data obtained by the plural imaging apparatus and the image data supplied from the image storing apparatus to generate the initial printed matter with first print out apparatus, and the system delivers the initial printed matter to a user on the spot. When the system receives an order of the print output of the image data including at least the captured image data with the second order receiving apparatus, the system stores the image data including the captured image data in the image storing apparatus through the second network, and the system finally receives the order with the first order receiving apparatus.

Moreover, a method for receiving an order for image printing according to an embodiment of the invention comprises the steps of: imaging objects by a plurality of imaging apparatus; printing captured image data supplied from the imaging apparatus through a first network and the image data supplied from the image storing apparatus through the first network to output initial printed matter by a first print out apparatus connected with the plural imaging apparatus through the first network; supplying captured image data from each of the plural imaging apparatus through the first network, the captured image data having been obtained by imaging of the object by each of the plural imaging apparatus; receiving an order of a print output by a second order receiving apparatus at every captured image data, the second order receiving apparatus being connected with the plural imaging apparatus through a second network that is different from the first network; storing the captured image data temporarily at every order by the second order receiving apparatus; storing image data including the captured image data supplied from the second order receiving apparatus through the first network by an image storing apparatus connected with the second order receiving apparatus through the first network; and receiving an order of the print output at each of the captured image data temporarily stored in the second order receiving apparatus by a first order receiving apparatus connected with the second order receiving apparatus through the first network.

In this method for receiving an order for image printing according to the embodiment of the invention, the captured image data obtained by the plural imaging apparatus and the image data supplied from the image storing apparatus are printed to generate the initial printed matter with first print out apparatus, and the initial printed matter is delivered to a user on the spot. Further in the method, when an order of the print output of the image data including at least the captured image data is received by the second order receiving apparatus, the image data including the captured image data is stored in the image storing apparatus through the second network, and the order is finally received by the first order receiving apparatus.

BRIEF DESCRIPTION OF THE DRAWINGS

The above and other objects, features and advantages of the present invention will become more apparent from the following description of the presently preferred exemplary embodiment of the invention taken in conjunction with the accompanying drawings, in which:

FIG. 2 is a diagram for illustrating various kinds of information concerning imaging, which information is stored in imaging databases included in imaging apparatus equipped in the print order receiving system;

FIG. 3 is a diagram for illustrating various kinds of information concerning order receiving, which information is stored in a receiving database included in a first order receiving server equipped in the print order receiving system;

FIG. 4 is a diagram for illustrating various kinds of information concerning image data, which information is stored in an image database included in an image storing server equipped in the print order receiving system;

FIG. 5 is a diagram for illustrating various kinds of information concerning charging and settlement, which information is stored in a charging database included in a charging & settlement server equipped in the print order receiving system;

FIG. 6 is a diagram for illustrating various kinds of information concerning the receiving of an order, which information is stored in an order database included in the first order receiving server equipped in the print order receiving system;

FIG. 8 is a diagram for illustrating a series of the processing processes in the print order receiving system, illustrating the process of ordering a print output of an image by imaging with the imaging apparatus;

FIG. 9 is a diagram for illustrating a series of the processing processes in the print order receiving system, illustrating a connection and user inquiry process and a reception and received content confirmation process in the processes of reordering later printed matter on the basis of captured image data later;

FIG. 10 is a diagram for illustrating a series of the processing processes in the print order receiving system, illustrating a payment confirmation and order receiving process and a printing and shipping process in the processes of reordering later printed matter on the basis of captured image data later;

FIG. 11 is a bock diagram illustrating the configuration of a print order receiving system as a second embodiment of the invention;

FIG. 12 is a diagram for illustrating various kinds of information concerning order receiving, which information is stored in an order database included in a second order receiving server equipped in the print order receiving system;

FIG. 22 is a diagram for illustrating a series of the processing processes in the print order receiving system, illustrating the process of ordering a print output of an image by imaging with the imaging apparatus.

BEST MODE FOR CARRYING OUT THE INVENTION

Hereinafter, detailed embodiments, to which the present invention is applied, are described in detail by reference to the attached drawings.

The embodiments concern a print order receiving system receiving order through a network when a two-dimensional or a three-dimensional image or picture (hereinafter referred to as image) including a static image, a motion picture and/or a parallax image, all being obtained by imaging, is supplied as printed matter. The print order receiving system supplies a service through the a network, and a user can accordingly reorder the printed matter obtained by imaging before, and further an business operator can accordingly increase the operation efficiency of the system.

Figure 1:
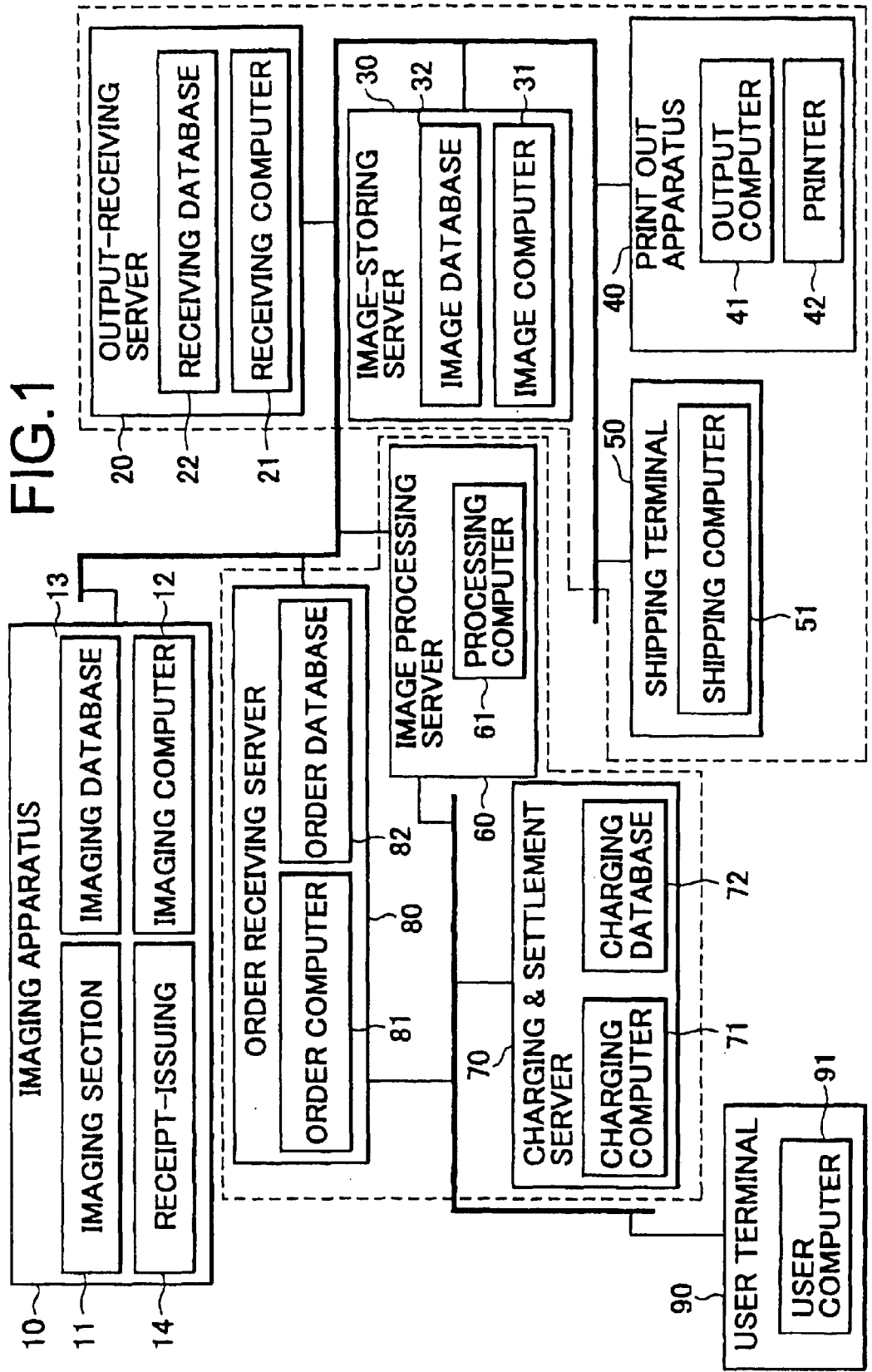
FIG. 1 is a block diagram showing the configuration of a print order receiving system as a first embodiment of the present invention.

At first, a first embodiment of the present invention is described as follows. A print order receiving system, as shown in FIG. 1, includes an imaging apparatus 10 for imaging at least an object, an output receiving server 20 as a first order receiving apparatus for receiving an order of a print output of an image, an image storing server 30 for storing the image, a print out apparatus 40 for printing the image to output printed matter, a shipping terminal 50 for executing shipping processing of the printed matter, an image processing server 60 for performing various kinds of processing of the image, a charging & settlement server 70 for performing the charging and the settlement of ordered printed matter, an order receiving server 80 as a second order receiving apparatus for receiving at least a reorder of the image, and a user terminal 90 owned by a user.

The output receiving server 20, the image storing server 30, the print out apparatus 40 and the shipping terminal 50 among those apparatus constitute the so-called backyard. The image processing server 60, the charging & settlement server 70 and the order receiving server 80 constitute a server group as the so-called storefront in correspondence with a user. Moreover, a network connecting the user terminal 90, the image processing server 60, the charging & settlement server 70 and the order receiving server 80 with each other is a public network such as the Internet. A network connecting the imaging apparatus 10, the output receiving server 20, the print image storing server 30, the print out apparatus 40, the shipping terminal 50, the image processing server 60, and the order receiving server 80 with each other is a network configured between business operators such as the so-called intranet or the like. In other words, in the print order receiving system, the imaging apparatus 10 are disposed at a plurality of places through the network, and a plurality of the user terminals 90 are connected to the network connecting the image processing server 60, the charging & settlement server 70 and the order receiving server 80 with each other.

The imaging apparatus 10 includes an imaging section 11 for imaging at least an object, an image computer 12 for performing the whole processing at event of imaging, the generation of various kinds of data, and the like, an imaging database 13 for storing various kinds of information concerning the imaging as a database, and an receipt-issuing 14 for issuing a receipt for certifying the contents of an order when the print output of the image is ordered.

The imaging section 11 is composed of, for example, a charge coupled device (CCD) camera, a necessary optical system and the like, and the imaging section 11 images the object and a background and the like as occasion demands under the control of the image computer 12. Captured image data obtained by the imaging of the imaging section 11 are supplied to the image computer 12.

The image computer 12 performs the control of the imaging section 11 at the event of imaging, and receives captured image data obtained by the imaging of the imaging section 11 to supply the captured image data to the image storing server 30. Moreover, the image computer 12 generates various kinds of information concerning imaging, the information indicating the contents of the imaging, at every imaging. The image computer 12 supplies the information to the imaging database 13 and the output receiving server 20 as order data. Moreover, the image computer 12 controls the receipt-issuing 14 to make it issue a receipt.

The imaging database 13 includes a large capacity storage medium such as a hard disc drive, and the image computer 12 stores various kinds of information concerning imaging, the information concerning the imaging generated by the image computer 12, as a database.

The various kinds of information concerning the imaging to be stored in the imaging database 13 are composed of, for example, as shown in FIG. 2, "Image number (Order Number)" indicating the identification number specific to each imaging (order), "Password" for certifying the eligibility of right of access to captured image data, "Imaging Date (Order Date)", "Order Output Type" indicating the type of an ordering image, "Order Size" and "Order Quantity" indicating the size and the quantity of the ordering image, respectively, "Addressee's Name" and "Addressee's Address" indicating the address of the image as the printed matter, "Captured Image Data" indicating the image data corresponding to the "Imaging Number", and "Foreground Image Data" and "Background Image Data" indicating the image data for being synthesized with the captured image data as a foreground and a background, respectively.

As for "Image number (Order Number)", each imaging (order) is given its peculiar identification number such as "JPCAM001" and "JPCAM002". "Password" is composed of a character string made by the random collection of, e.g. alphabet characters and numerals, and each imaging (order) is given its peculiar information such as "468ace02" and "97531fdb" as its password. "Imaging Date (Order Date)" indicates the date when each imaging (order) is given in an information form of, e.g. its year/month/date/time. "Order Output Type" indicates the type of an ordering image such as "color" or "monochrome". "Order Size" indicates the size of the ordering image by the information such as "Large Printing (L)" and "Small Printing (S)". "Order Quantity" indicates the number of sheets of the ordering image. "Addressee's Name" indicates the name corresponding to the addressee of the ordered image, and the name is, e.g. the full name of each user. "Addressee's Address" indicates each address corresponding to the addressee of each ordered image, and the address is, e.g. the address of each user. "Captured Image Data" are link information to the captured image data itself obtained by the imaging by the imaging section 11, and the "Captured Image Data" indicate the type of the image such as a "static image" or a "motion picture" as the need arises. "Foreground Image Data" indicates the identification number of image data to be synthesized with the captured image data obtained by the imaging by the imaging section 11 as a foreground, and a number peculiar to the image data such as "JPFR001" is given as the "Foreground Image Data". "Background Image Data" indicates the identification number of image data to be synthesized with the captured image data obtained by the imaging by the imaging section 11 as a background, and a number peculiar to the image data such as "JPBK002" and "JPBK001" are given as the "Background Image Data".

The imaging database 13 stores such information to be generated corresponding to a plurality of events of imaging as a database. Various kinds of information are read from the imaging database 13 by the image computer 12 as the need arises.

The receipt-issuing 14 issues at least the aforesaid "Image number (Order Number)" and "Password" as a receipt under the control of the image computer 12. In other words, the receipt has the entered information for the certification of the contents of an order. A user reorders of printed matter on the basis of the information entered in the receipt. In addition, in the print order receiving system, a receipt may be delivered to a user on the spot by being printed and issued by the receipt-issuing 14. The receipt can also be delivered to the user by the transmission of the receipt to the user terminal 90 through the network by the use of the so-called mail function. In the latter case, by the input of the address of the user terminal 90 where the user wants to transmit the receipt with a not shown operating section, the imaging apparatus 10 transmits the receipt issued by the receipt-issuing 14 to the user terminal 90 designated by the address through a predetermined provider under the control of the image computer 12 as mail.

This imaging apparatus 10 are only ones to which a user goes to the situated places and faces them among various kinds of apparatus that the business operator has established. The user performs imaging at a nearby imaging apparatus 10. By the payment of a rental fee in, for example, coins by the user, the imaging apparatus 10 images at least an object, and the imaging apparatus 10 generates the information concerning the imaging together with captured image data.

The output receiving server 20 includes a receiving computer 21 for performing the whole processing concerning the order receiving of a print output of an image, the generation of various kinds of data, and the like, and a receiving database 22 for storing the various kinds of information concerning order receiving as a database.

The receiving computer 21 generates the various kinds of information concerning the order receiving on the basis of the aforesaid order data supplied from the imaging apparatus 10 to supply the generated information to the receiving database 22. Moreover, the receiving computer 21 generates the information to be needed for re-receiving the order of the print output of the image as the preparation for a user's reorder of the printed matter of the image corresponding to the order data later, and the receiving computer 21 supplies the generated information to the order receiving server 80 as reorder receiving inquiry data. Moreover, the receiving computer 21 generates a print instruction control signal for instructing the printing of an image. The receiving computer 21 supplies the print instruction control signal to the print out apparatus 40 and further the receiving computer 21 supplies an image requirement control signal indicating the requirement of image data to be printed to the image storing server 30. Furthermore, at the event of the re-receiving of an order, the receiving computer 21 receives re-receiving data from the order receiving server 80 to generate the various kinds of information concerning order receiving on the basis of the re-receiving data. Then the receiving computer 21 supplies the generated information to the receiving database 22.

The receiving database 22 includes a large capacity storage medium such as a hard disk drive, and stores the various kinds of information that concern order receiving and were generated by the receiving computer 21 as a database.

The various kinds of information that concern order receiving and are to be stored in the receiving database 22 were generated by the receiving computer 21 on the basis of the aforesaid order data supplied from the imaging apparatus 10. The various kinds of information are composed of, for example, as shown in the upper two lines of FIG. 3, the elements of "Image number (Order Number)", "Password", "Imaging Date (Order Date)", "Order Output Type", "Order Size", "Order Quantity", "Addressee's Name", "Addressee's Address", "Captured Image Data", "Foreground Image Data" and "Background Image Data" like the aforesaid various kinds of information concerning imaging. The information concerning imaging is used as it is as the information except for "Captured Image Data" among these various kinds of information. Moreover, as to "Captured Image Data", "Image number (Order Number)" is given as the link information to the corresponding captured image data.

Moreover, there are some kinds of information generated by the receiving computer 21 on the basis of the aforesaid re-receiving data supplied from the order receiving server 80. Those kinds of information, for example, are shown in the lower two lined of FIG. 3. Among these various kinds of information, the information the "Image number (Order Number)" of which is designated by "JPNET001" indicates a reorder of a print output of an image made by the synthesis of the image data of "JPFR002" and "JPBK001" as the foreground image data and the background image data, respectively, with the captured image data that once imaged and is designated by "JPCAM002". The information the "Image number (Order Number)" of which is designated by "JPNET002" indicates a reorder of a print output of an image made by the synthesis of the image data of "JPFR002" and "JPBK001" as the foreground image data and the background image data, respectively, with the captured image data that once imaged and is designated by "JPCAM001".

The receiving database 22 stores such information as generated corresponding to a plurality of kinds of order receiving as a database. Various kinds of information are read from the receiving database 22 by the receiving computer 21 as the need arises.

This output receiving server 20 performs the whole processing concerning the order receiving of a print out of an image, and generates the information concerning each order receiving indicating the contents of the order receiving.

The image storing server 30 includes an image computer 31 for performing the whole control at the event of storing image data, the generation of various kinds of data and the like, and an image database 32 for storing various kinds of information concerning the storage of image data as a database.

The image computer 31 receives the captured image data obtained by the imaging of the imaging apparatus 10 and makes the image database 32 equipped with a not shown large capacity storage medium such as a hard disk drive store the received captured image data. Moreover, the image computer 31 makes the image database 32 store various kinds of image data such as the image data generated by computer graphics (CG) besides the captured image data obtained by the imaging of the imaging apparatus 10. In other words, the image computer 31 makes the image database 32 store the foreground image and the background image besides the aforesaid captured image data. Moreover, the image computer 31 generates various kinds of information concerning image data indicating the contents of the image data corresponding to the stored image data. The image computer 31 supplies the generated information to the image database 32 for making the image database 32 store the supplied information. Furthermore, the image computer 31 reads the image data from the image database 32 that were required corresponding to an image requirement control signal supplied from the output receiving server 20 and the print out apparatus 40. The image computer 31 supplies the read image data to the print out apparatus 40. Furthermore, the image computer 31 reads the image data from the image database 32 which were required corresponding to the image requirement control signal supplied from the image processing server 60. The image computer 31 supplies the read image data to the image processing server 60.

The image database 32 includes a large capacity storage medium such as a hard disk drive. The image database 32 stores various kinds of image data under the control of the image computer 31, and stores various kinds of information that concern image data and are generated by the image computer 31 as a database.

The various kinds of information that concern the image data and are stored in the image database 32 are, for example, as shown in FIG. 4, composed of the elements of "Image Number (Imaging or Order Number)" indicating the identification number peculiar to each imaging (order), "Password" for certifying the eligibility of right of access to captured image data, "Registered Date (Imaging or Order Date)" indicating the data when the image data were stored, and "Image Data" indicating the image data corresponding to "Image Number (Imaging or Order Number)".

As for "Image number (Imaging or Order Number)", each image data is given its peculiar identification number such as "JPFR001", "JPBK001", "JPBK002", "JPCAM001" and "JPCAM002". Now, the image data designated by "JPFR001" and "JPFR002" are each stored in the image computer 31 as the foreground image data as mentioned above. The image data designated by "JPBK001" and "JPBK002" are severally stored in the image computer 31 as the background image data as mentioned above. Moreover, the image data designated by "JPCAM001" and "JPCAM002" are severally stored as the captured image data obtained by the imaging of the imaging apparatus 10 as mentioned above. "Password" is composed of a character string made by the random collection of, e.g. alphabet characters and numerals, and each captured image data is given its peculiar information. It is needless to say that "Password" to the captured image data obtained by the imaging of the imaging apparatus 10 is the same one in the various kinds of information concerning the aforesaid imaging. "Registered Date (Imaging or Order Date)" indicates the date when the imaging data were registered in the image computer 31 or the data when the imaging (order) was performed. "Image Data" are link information to the stored image data, and the "Image Data" indicate the type of the image such as a "static image" or a "motion picture" as the need arises.

The image database 32 stores such information generated corresponding to a plurality of image data as a database. Various kinds of information are read from the image database 32 by the image computer 31 as the need arises.

This image storing server 30 stores various kinds of image data, and generates the information concerning image data.

The print out apparatus 40 includes an output computer 41 for performing the whole processing at the event of outputting printed matter, and a printer 42 for discharging the printed matter.

When a printing instruction control signal instructing the printing of an image is supplied to the output computer 41 from the output receiving server 20, the output computer 41 supplies an image requirement control signal indicating the requirement of the image data to be printed to the image storing server 30, and the output computer 41 makes the printer 42 print the image data read in response to the image requirement control signal. When the printing ends, the output computer 41 supplies a print ending control signal indicating the ending of the printing of an image together with the generated printed matter to the shipping terminal 50.

The printer 42 prints an image under the control of the output computer 41 to discharge it as printed matter to the outside. The printed matter is supplied to the shipping terminal 50 by the output computer 41 as mentioned above.

This print out apparatus 40 prints the designated image, and generates printed matter as a final shipping object.

The shipping terminal 50 includes a shipping computer 51 for executing the whole control at the event of the shipment of printed matter.

When a print ending control signal indicating the end of the printing of an image is supplied to the shipping computer 51 from the print out apparatus 40, the shipping computer 51 performs various kinds of processing for the preparation for shipment. To put it specifically, the shipping computer 51 generates the information concerning the addressee, printed matter and the like for shipping the designated printed matter to the correct addressee. When the preparation for the shipping is completed, the printed matter is shipped. As the form of the shipment, for example, a transportation trust to a transport company or the like, a mailing trust and the like can be considered. The shipping computer 51 generates shipping information indicating the shipping of the printed matter, and records the information in, for example, a hard disk drive or the like, or displays the information on a display.

This shipping terminal 50 performs various kinds of processing such as the generation of various kinds of information necessary for the shipping of printed matter to a user being a right addressee.

The image processing server 60 includes a processing computer 61 for performing image processing.

When a preview display instruction control signal for instructing the not shown display of the user terminal 90 to display an image is supplied to the processing computer 61 from the order receiving server 80, the processing computer 61 supplies an image requirement control signal indicating the requirement of the image data to be displayed to the image storing server 30. Then, the processing computer 61 processes the image data that were read in response to the image requirement control signal as the need arises, and the processing computer 61 supplies the read image data to the user terminal 90 as a preview image to make the displaying the preview image. The processing computer 61 performs as its image processing such as the processing for synthesizing captured image data and desired foreground image data and/or desired background image data.

This image processing server 60 processes image data to generate a preview image for displaying an image similar to the printed matter.

The charging & settlement server 70 includes a charging computer 71 for performing the whole processing for charging and settlement and the generation of various kinds of data, and a charging database 72 for storing various kinds of information concerning charging and settlement as a database.

When a charging instruction control signal for instructing charging is supplied to the charging computer 71 from the order receiving server 80, the charging computer 71 requires payment information, which is the information concerning a payment method necessary for the payment of charge, of the user terminal 90. Then, when the charging computer 71 receives the payment information from the user terminal 90 as reorder data, the charging computer 71 executes its charging processing. And then, the charging computer 71 supplies a payment completion control signal indicating the completion of payment to the user terminal 90. Moreover, the charging computer 71 supplies a charging completion control signal indicating the completion of the charging processing to the order receiving server 80. The charging computer 71 generates various kinds of information concerning the charging and the settlement, both indicating the contents of charging processing on the basis of the reorder data at the event of the processing to make the charging database 72 store the information.

The charging database 72 includes a large capacity storage medium such as a hard disk drive. The various kinds of information that concern charging and settlement and are generated by the charging computer 71 are stored in the charging database 72 as a database.

The various kinds of information that concern charging and settlement and are to be stored in the charging database 72 are, for example, as shown in FIG. 5, composed of "Charging Number" indicating the identification number peculiar to each request of a charge, "Charging Date" indicating the date of the commencement of charging processing, "Charged Amount (Ordered Price)", "Payment Method", "Financial Institution Name", "Credit Card Number & Account Number" and "Settlement Status".

The identification number peculiar to each request of a charge such as "JPPAY800" and "JPPAY801" is given as "Charging Number". "Charging Date" indicates the data of the commencement of charging processing. "Charged Amount (Ordered Price)" indicates the charge of the ordered printed matter. "Payment Method" indicates the method of the payment of each charge such as the payment of the charge from a bank account. In the columns of "Payment Method", for example, the information of "Credit Card" is recorded when a user hopes the payment with a credit card, and the information of "Bank Account" is recorded when a user hopes the payment from a bank account. "Financial Institution Name" indicates the name of a financial institution corresponding to each payment method. In the columns of "Financial Institution Name", for example, the name of a credit card company is recorded when a user hopes the payment with a credit card, and the name of a bank is recorded when a user hopes the payment from the user's banking account. "Credit Card Number & Account Number" indicates each credit card number corresponding to each payment method. In the columns of "Credit Card Number & Account Number", for example, the credit card number of a user is recorded when the user hopes the payment with the credit card, and the cash card number of a bank of a user is recorded when the user hopes the payment from the bank account. "Settlement Status" indicates each progressing status of charging processing such as "Payment Pending" and "Payment Received".

The charging database 72 stores such information generated corresponding to a plurality of status of charging processing as a database. Various kinds of information are read from the charging database 72 by the charging computer 71 as the need arises.

This charging & settlement server 70 carries the whole processing concerning charging and settlement, and generates information concerning charging and settlement.

The order receiving server 80 includes an order computer 81 for performing the whole processing at the event of receiving an order including a reorder for an image and the generation of various kinds of data, and an order database 82 for storing various kinds of information concerning the reception of orders of images as a database.

The order computer 81 generates various kinds of information, which concern the receiving of an order including a reorder and indicate the contents of the order, on the basis of the reorder receiving inquiry data for the preparation for a case in which a user reorders the aforesaid print matter of the image corresponding to the order data when the reorder receiving inquiry data generated by the output receiving server 20 is supplied. Then, the order computer 81 supplies the information to the order database 82.

And then, the order computer 81 makes a not shown display of the user terminal 90 display a predetermined initial screen for reordering when a connection is required by the user terminal 90. When various kinds of information indicating reordered contents are supplied to the order computer 81 from the user terminal 90 as reorder data, the order computer 81 performs various kinds of processing concerning reordering on the basis of the reorder data. To put it specifically, the order computer 81 performs user inquiry using the aforesaid reorder receiving inquiry data when a requirement of a reorder is transmitted from the user terminal 90. When the user is an eligible person as a result of the inquiring, the order computer 81 makes the displaying of a predetermined menu screen for reordering on the display screen of the user terminal 90. According to a selection operation of the user terminal 90 with the menu screen, the order computer 81 supplies a preview display instruction control signal for making the display of the user terminal 90 display a preview image to the image processing server 60. Then, when a confirmation control signal indicating an order after the confirmation of the preview image is supplied to the order computer 81 from the user terminal 90, the order computer 81 makes the display of the user terminal 90 display a predetermined payment method screen concerning the payment of a charge. In response to a selection operation of the user terminal 90 with the payment method screen, the order computer 81 supplies the aforesaid charging instruction control signal Instructing charging to the charging & settlement server 70. Moreover, when the aforesaid charging completion control signal indicating the completion of charging processing is supplied to the order computer 81 from the charging & settlement server 70, the order computer 81 supplies a reception completion control signal indicating the completion of receiving the reorder to the user terminal 90, and further the order computer 81 supplies re-receiving data indicating the contents of the reorder to the output receiving server 20. The order computer 81 generates the information that concerns the reorder and indicates the contents of the reorder as the aforesaid various kinds of information concerning the reception of the order, and the information is supplied to the order database 82.

The order database 82 includes a large capacity storage medium such as a hard disc drive, and the order database 82 stores various kinds of information that were generated by the order computer 81 and concern the reception of an order as a database.

The various kinds of information concerning the reception of an order to be stored in the order database 82 are composed of, for example, as shown in FIG. 6, the elements of "Order Number" indicating the identification number peculiar to each order, "Password" for verifying the right to access each captured image data, "Order Date" indicating each ordered date, "Order Output Type" indicating the type of each ordered image, "Ordered Size", "Ordered Quantity" and "Ordered Price" indicating the size, the quantity and the price of each ordered image, respectively, "Charging Number" numbered at every requirement of a charge as its peculiar identification number, "Addressee's Name" and "Addressee's Address", both indicating the addressee of each image as printed matter, "Captured Image Data" indicating the image data corresponding to the order number, and "Foreground Image Data" and "Background image Data" to be synthesized with the captured image data as a foreground and a background, respectively.

As for "Order Number", each order is given its peculiar identification number such as "JPCAM001", "JPCAM002", "JPNET001" and "JPNET002". Now, the information the "Order Number" of which is designated by "JPCAM*" indicates that the information is an order by the imaging of the imaging apparatus 10. The information the "Order Number" of which is designated by "JPNET*" indicates that the information is a reorder based on the captured image data that were once imaged. "Password" is composed of a character string made by the random collection of, e.g. alphabet characters and numerals, and each order is given its peculiar information. It is needless to say that that "Password" to the captured image data obtained by the imaging of the imaging apparatus 10 is the same one in the various kinds of information concerning the aforesaid imaging. "Password" to the captured image data to be reordered is the same one in the aforesaid various kinds of information concerning the order receiving. In other words, "Password" is given to each of the captured imaging data obtained by the first imaging of the imaging apparatus 10. "Order Date" indicates the date when each order is issued. "Order Output Type" indicates the type of each ordered image. "Ordered Size" indicates the size of the ordered image. "Ordered Quantity" indicates the number of sheets of the ordered image, and "Ordered Price" indicates each total price designated by the unit price of each ordered merchandise multiplied by its quantity. Each requirement for a charge is given its peculiar identification number as its "Charging Number". "Addressee's Name" indicates the name corresponding to the addressee of each ordered image. "Addressee's Address" indicates each address corresponding to the addressee of each ordered image. "Captured Image Data" are link information to the ordered captured image data, and indicate the type of images such as a static image or a motion picture as the need arises. "Foreground Image Data" indicate the identification number of the image data to be synthesized with the ordered captured image data as a foreground. "Background Image Data" indicate the identification number of the image data to be synthesized with the ordered capture image data as a background.

The order database 82 stores such information to be generated corresponding to a plurality of orders including reorders as a database. Various kinds of information are read from the order database 82 by the order computer 81 as the need arises.

This order receiving server 80 receives orders including reorders of images and generates the information concerning the reception of the orders.

The user terminal 90 includes a user computer 91 for the usage of a user.

The user computer 91 is a computer in possession or available to the user's side, and such user computer 91 is an apparatus such as a personal computer, a cellular phone, or a portable information terminal apparatus like a personal digital assistant or the like, all of them capable of being connected with a network such as the Internet. The user computer 91 makes a connection request to the order receiving server 80 by a predetermined provider at the event of performing the reorder of an image. When the connection is permitted, the user computer 91 downloads the aforesaid predetermined initial screen for reorder from the order receiving server 80, and displays the initial screen on the display thereof (not shown in the figures). Moreover, when a user makes a request of a reorder by operating the buttons or the like on the initial screen, the user computer 91 supplies the reorder data to the order receiving server 80 in response to the request of the reorder data from the order receiving server 80. When the reorder is permitted as a result thereof, the user computer 91 downloads the aforesaid predetermined menu screen for reorder from the order receiving server 80, and the user computer 91 displays the menu screen on the display. Furthermore, the user computer 91 downloads a preview image of the printed matter of the reordered image from the image processing server 60, and the user computer 91 displays the preview image on the display. When the user confirms the preview image and performs a predetermined operation for indicating the decision of the reorder in response to the display of the preview image, the user computer 91 supplies the aforesaid confirmation control signal to the order receiving server 80. Then, the user computer 91 downloads the aforesaid predetermined payment method screen from the order receiving server 80, and displays the payment method screen on the display. By the user's operation of the button or the like on the payment method screen for the selection of a payment method, the user computer 91 supplies a payment method control signal indicating the selected payment method to the order receiving server 80. Furthermore, by the user's input of the predetermined payment information with a not shown operation section in response to the request of the aforesaid payment information from the charging & settlement server 70, the user computer 91 supplies the payment information to the charging & settlement server 70 as the aforesaid reorder data. Then, the user computer 91 is supplied with the aforesaid payment completion control signal from the charging & settlement server 70, and is supplied with the aforesaid reception completion control signal from the order receiving server 80.

This user terminal 90 works as a user interface at the event of reordering, and the user terminal 90 is also a communication terminal enabling a user to perform the delivery of information between a business operator through a network.

Figure 7:
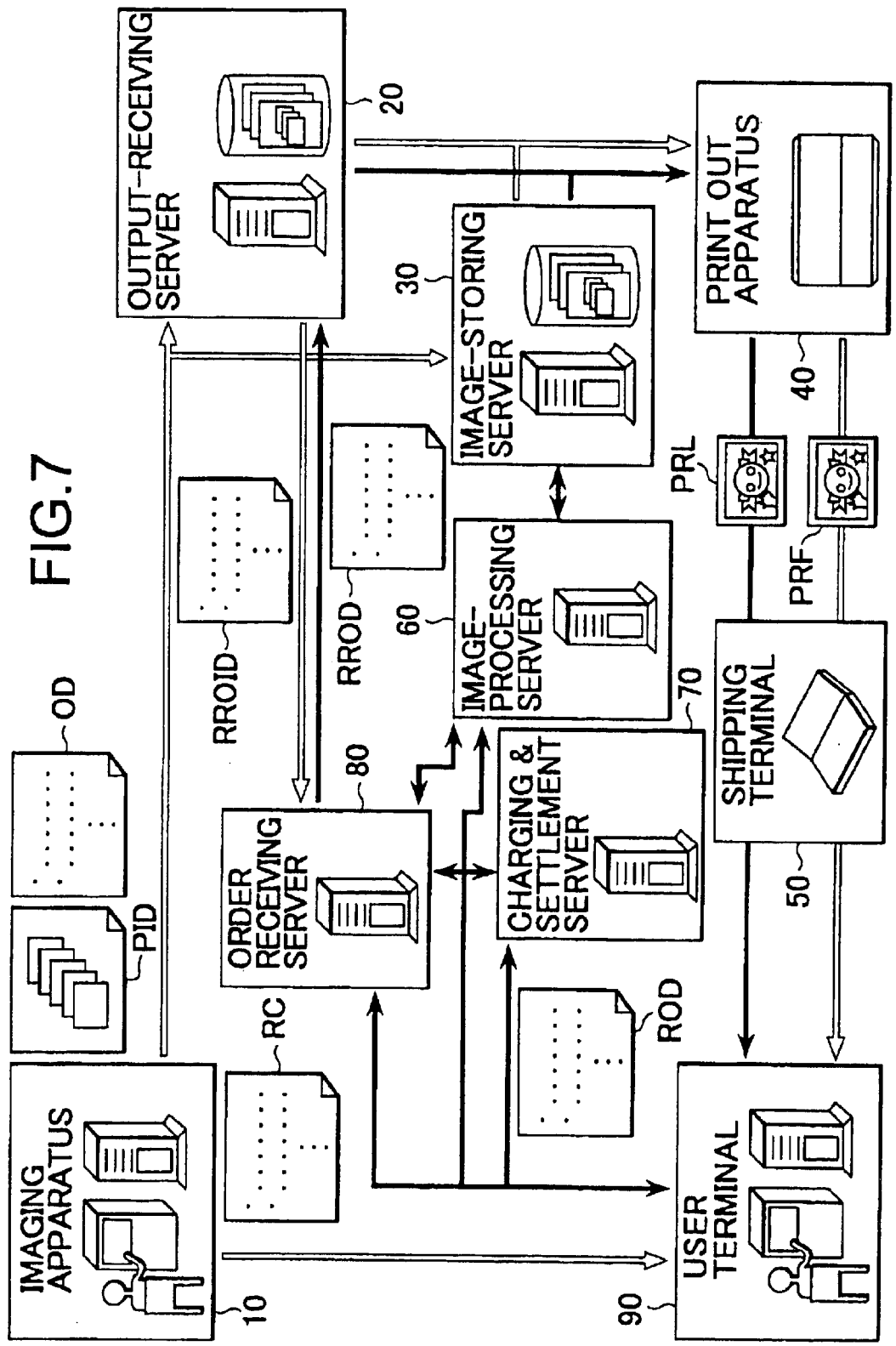
FIG. 7 is a diagram for illustrating information handed over between each apparatus in the print order receiving system.

Now, the print order receiving system composed of each apparatus like this performs the delivery of information between each apparatus as shown in FIG. 7, and receives an order of a print output of an image. In addition, in FIG. 7, white arrows indicate information delivered in a process for ordering a print output of an image by the imaging of the imaging apparatus 10, and black arrows indicate information to be delivered in a process for a later reorder based on a captured image data obtained by previous imaging. Moreover, in the following, a printed matter shipped in the process indicated by the white arrows is called as "initial printed matter", and a printed matter in the process indicated by the black arrows is called as "later printed matter" as the need arises.

In the print order receiving system, the whole processing is commenced by the imaging of a user with the imaging apparatus 10 at first. Now, the user performs the imaging with the imaging apparatus 10 by paying a rental fee, for example, in coins or the like. It is supposed that the rental fee usually includes the charge of initial printed matter. In other words, the user performs the imaging by paying the consideration of the initial printed matter. In the print order receiving system, the aforesaid order data OD generated by the imaging apparatus 10 are supplied to the output receiving server 20, and the captured image data PID obtained by the imaging with the imaging apparatus 10 are supplied to the image storing server 30. Moreover, in the print order receiving system, the aforesaid receipt RC issued by the imaging apparatus 10 is directly delivered to the user or is delivered to the user through the user terminal 90.

In the print order receiving system, when the order of the print output of the captured image data PID is received in such a way, the output receiving server 20 generates the aforesaid reorder receiving inquiry data RROID. The reorder receiving inquiry data RROID are supplied to the order receiving server 80. In the print order receiving system, the image storing server 30 and the print out apparatus 40 is actuated in response to a print instruction from the output receiving server 20 to generate the initial printed matter PRF. The initial printed matter PRF is shipped to the user through the shipping terminal 50.

In the print order receiving system, the delivery of information is performed in such a way, and then the initial printed mater PRF of a captured image data PID reaches the user.

Moreover, in the print order receiving system, the user can later reorder the later printed matter of the image based on the captured image data PID, more specifically, the same printed matter as the initial printed matter PRF or similar printed matter made by the change of the foreground and/or the background other than the object of the initial printed matter PRF.

In this case, in the print order receiving system, processing is commenced by the accessing of a user to the order receiving server 80 with the user terminal 90 at first. In the print order receiving system, a user transmits reorder data ROD to the order receiving server 80 with the user terminal 90. In other words, in the print order receiving system, by the user's generation of the reorder data ROD on the basis of the aforesaid information entered in the receipt RC, the captured image data PID being a basis of the reordered image is specified. And then, it is certified that the user is an eligible person of the right of accessing the captured image data PID on the basis of the aforesaid reorder receiving inquiry data RROID, more specifically on the basis of the aforesaid various kinds of information that concern the receiving of an order including the reorder and is generated on the basis of the reorder receiving inquiry data RROID.

In the print order receiving system, when the later printed matter of the image data based on the captured image data PID is ordered in such a way, the image processing server 60 reads the captured image data PID, foreground image data and/or background image data, all being designated by the image storing server 30, and the predetermined image processing is performed to the read image data. The image data obtained as a result of the processing are downloaded to the user terminal 90 as a preview image, and are displayed on the display of the user terminal 90. In the print order receiving system, when a user confirms a preview image, the payment information as the aforesaid reorder data ROD is delivered between the user terminal 90 and the charging & settlement server 70, and thereby the charging processing is performed. In the print order receiving system, the order receiving server 80 generates re-receiving data RROD corresponding to the charging processing. By the supply of the re-receiving data RROD to the output receiving server 20, the order of the later printed matter is re-received. Then, in the print order receiving system, the image storing server 30 and the print out apparatus 40 operate to generate the later printed matter PRL in response to a print instruction from the output receiving server 20. The later printed matter PRL is shipped to the user through the shipping terminal 50.

In the print order receiving system, the delivery of information is performed in such a way, and then the later printed matter PRL of the image data based on the captured image data PID reaches the user.

In more concrete terms, the print order receiving system receives an order of a print output of a captured image data PID and receives a reorder of a print output of image data based on the captured image data PID by performing a series of processing as shown in FIG. 8 to FIG. 10. In addition, in FIG. 8 to FIG. 10, the contents of the processing of each apparatus in the print order receiving system are shown, and the timing of the delivery of information between each apparatus is also shown. Moreover, in FIG. 8 to FIG. 10, as mentioned above, white arrows indicate information delivered in a process for ordering a print output of an image by the imaging of the imaging apparatus 10, and black arrows indicate information to be delivered in a process for a later reorder based on a captured image data obtained by previous imaging. Moreover, the user terminal 90 in FIG. 8 to FIG. 10 may designate an actual user oneself.

At first, the processes of ordering a print output of an image by imaging with the imaging apparatus 10 in the print order receiving system are performed through a series of processing as shown in FIG. 8.

In other words, in the print order receiving system, when a user pays a fee against the imaging apparatus 10, as shown in FIG. 8, at step S1, the imaging apparatus 10 performs the imaging of an object. At this event, in the print order receiving system, order data OD are generated by the imaging apparatus 10 to be supplied to the output receiving server 20. Moreover, in the print order receiving system, captured image data PID are supplied from the imaging apparatus 10 to the image storing server 30. With this, in the print order receiving system, at step S2, the order data OD are stored by the output receiving server 20. Moreover, in the print order receiving system, at step S3, the image storing server 30 stores the captured image data PID.

Next, in the print order receiving system, at step S4, the imaging apparatus 10 issues a receipt RC. The user or the user terminal 90, at step S5, receives the receipt RC.

Next, in the print order receiving system, at step S6, the output receiving server 20 generates reorder receiving inquiry data RROID to supply the generated reorder receiving inquiry data RROID to the order receiving server 80. With this, in the print order receiving system, at step S7, the order receiving server 80 stores the reorder receiving inquiry data RROID.

In succession, in the print order receiving system, at step S8, the output receiving server 20 generates a print instruction control signal C1 for instructing the print of an image to supply the print instruction control signal C1 to the print out apparatus 40. Moreover, in the print order receiving system, image requirement control signals C2 and C3 indicating the requirement of image data to be printed are supplied from the output receiving server 20 and the print out apparatus 40, respectively, to the image storing server 30. With this, in the print order receiving system, the image data PRID to be printed corresponding to the image requirement control signals C2 and C3 are read from the image storing server 30 to be supplied to the print out apparatus 40.

Next, in the print order receiving system, at step S9, the print out apparatus 40 performs the printing processing of image data PRID, and at step S10, the post processing of the printing is performed as the need arises. As the post processing of the printing, predetermined heating processing to a hologram is considerable in a case in which the printed matter is made by the use of, fore example, holography techniques. Moreover, the post processing of the printing also includes the processing such as the cutting of printed matter into a predetermined size and the affixing of printed matter on a predetermined mount.

Then, in the print order receiving system, the print out apparatus 40 supplies a print ending control signal C4 indicating the ending of the print of the image together with the generated initial printed matter PRF to the shipping terminal 50. With this, in the print order receiving system, at step S11, the shipping terminal 50 performs predetermined shipping processing to ship the initial printed matter PRF to a user. The user receives the shipped initial printed matter PRF at step S12, and the series of processing is terminated.

As described above, in the print order receiving system, a user can receive an initial printed matter PRF of captured image data PID obtained by imaging with the imaging apparatus 10.

On the other hand, in the print order receiving system, the process for reordering later printed matter PRL later on the basis of a captured image data PID is performed through a series of processing as shown in FIG. 9 and FIG. 10. The process is roughly divided into four processes, i.e. a connection & user inquiry process, a reception and received content confirmation process, a payment confirmation and order receiving process, and a printing and shipping process.

At first, in the print order receiving system, as shown in FIG. 9, the connection & user inquiry process is performed. In the print order receiving system, at step S21, the user terminal 90 performs access processing to the order receiving server 80. The access processing is for example the following processing. In other words, a user starts the so-called browse software for browsing the so-called Web site, and inputs a uniform resource locator (URL) indicating the Web site for performing a reorder with a not shown operating section to try the establishment of communication between the user terminal 90 and the order receiving server 80 through a predetermined provider. In the print order receiving system, a connection requirement control signal C21 for requiring connection is supplied from the user terminal 90 to the order receiving server 80 in response to the access processing. Thereby, in the print order receiving system, when the connection is permitted, the aforesaid predetermined initial screen IV for reorder is downloaded from the order receiving server 80 to the user terminal 90 to be displayed on the display of the user terminal 90 (not shown in the figures).

Next, in the print order receiving system, the user requests a reorder by operating a selection button on an initial screen IV with an operation section. In the print order receiving system, the user terminal 90 supplies a reorder request control signal C22 for the request of a reorder to the order receiving server 80 in response to the request. As a result, in the print order receiving system, the order receiving server 80 supplies a request control signal C23 for requesting the upload of reorder data ROD of the user terminal 90. In the print order receiving system, at step S22, the reorder data ROD is generated by user's input of predetermined information with the operation section after the user's confirmation of the contents of the receipt RC in response to the request. In the print order receiving system, the reorder data ROD is supplied from the user terminal 90 to the order receiving server 80.

Then, in the print order receiving system, at step S23, the order receiving server 80 inquires the user by inspecting the conformity between the reorder receiving inquiry data RROID and the reorder data ROD.

Next, in the print order receiving system, when the eligibility of a user is certified and the user's reorder is permitted, the reception and received content confirmation process is performed. In the print order receiving system, the aforesaid predetermined menu screen MV for a reorder is downloaded from the order receiving server 80 to the user terminal 90 to be displayed on the display of the user terminal 90. In the print order receiving system, a user issues a reorder by selecting desired image data to reorder in the menu displayed on the menu screen MV by operating a selection button for selecting the image data with the operating section. At that time, the user can select desired foreground image data and/or desired background image data besides captured image data PID. In the print order receiving system, in response to the user's selection operation, an image data selection control signal C24 indicating the selected image data is supplied from the user terminal 90 to the order receiving server 80. Thereby, in the print order receiving system, at step S24, reception contents such as the selected image data and an ordered quantity are confirmed by the order receiving server 80.

In succession, in the print order receiving system, a preview display instruction control signal C25 for making the display of the user terminal 90 display a preview image on the basis of the selected image data is supplied from the order receiving server 80 to the image processing server 60. Thereby, in the print order receiving system, at step S25, the image processing server 60 performs the predetermined preparation processing for performing the display of a preview image to the user terminal 90. Then, in the print order receiving system, an image requirement control signal C26 indicating the requirement for the image data to be displayed as preview display is supplied from the image processing server 60 to the image storing server 30.

Next, in the print order receiving system, image data PVID are read from the image storing server 30 in response to the image requirement control signal C26 to be supplied to the image processing server 60. In addition, the image data PVID do not include only the captured image data PID but include also the foreground image data and/or the background image data. In the print order receiving system, at step S26, the image processing server 60 performs the predetermined image processing of the image data PVID, i.e. the processing such as synthesizing the captured image data PID with the foreground image data and/or the background image data, to supply the processed image data PVID to the user terminal 90 as a preview image PVI. The preview image PVI is displayed on the display in the user terminal 90.

Then, in the print order receiving system, when the user confirms the preview image PVI and performs a predetermined operation indicating the decision of the reorder of later printed matter PRL having the same contents as the preview image PVI, the user terminal 90 supplies a confirmation control signal C27 indicating the confirmation and the order of the preview image PVI to the order receiving server 80. In the print order receiving system, at step S27, the order receiving server 80 confirms the final reception contents.

Next, in the print order receiving system, as shown in FIG. 10, the payment confirmation and order receiving process is performed. In the print order receiving system, the aforesaid predetermined payment method screen CV is downloaded from the order receiving server 80 to the user terminal 90 to be displayed on the display of the user terminal 90. In the print order receiving system, a user selects a desired payment method in the menu displayed in the payment method screen CV and operates the selection button for the selection of the payment method with the operation section, and thereby a payment method control signal C28 is supplied from the user terminal 90 to the order receiving server 80. Then, in the print order receiving system, at step S28, the order receiving server 80 confirms the payment method, and a charging instruction control signal C29 instructing charging is supplied to the charging & settlement server 70.

Next, in the print order receiving system, at step S29, the charging & settlement server 70 performs predetermined preparation processing for executing charging processing, and the charging & settlement server 70 supplies a payment information requirement signal C30 for requiring the aforesaid payment information to the user terminal 90. As a result, in the print order receiving system, by the user's input of the predetermined payment information with the operation section of the user terminal 90, the payment information is generated as the aforesaid reorder data ROD by the user terminal 90 to be supplied to the charging & settlement server 70. In the print order receiving system, when the reorder data ROD are supplied from the user terminal 90 to the charging & settlement server 70, at step S30, the charging & settlement server 70 executes the charging processing.

Then, in the print order receiving system, a payment completion control signal C31 indicating the completion of the payment is supplied from the charging & settlement server 70 to the user terminal 90, and a charging completion control signal C32 indicating the completion of the charging processing is supplied from the charging & settlement server 70 to the order receiving server 80. In the print order receiving system, at step S31, the order receiving server 80 performs the processing for completing the reorder receiving to supply a reception completion control signal C33 indicating the completion of the reception to the user terminal 90, and further the aforesaid re-receiving data RROD are supplied from the order receiving server 80 to the output receiving server 20.

In sequence, in the print order receiving system, the printing and shipping process is performed. The printing and shipping process is similar to the aforesaid process from step S8 to S12. In other words, in the print order receiving system, at step S32, the output receiving server 20 generates a printing instruction control signal C34 for instructing the printing of an image to be supplied to the print out apparatus 40. Moreover, in the print order receiving system, image requirement control signals C35 and C36 indicating the requirement of the image data to be printed are supplied from the output receiving server 20 and the print out apparatus 40 to the image storing server 30. As a result, in the print order receiving system, image data PRID to be printed are read from the image storing server 30 in response to the image requirement control signals C35 and C36 to be supplied to the print out apparatus 40.

Next, in the print order receiving system, at step S33, the print out apparatus 40 performs the printing processing of the image data PRID, and further, at step S34, the print out apparatus 40 performs the post processing of the printing similar to the aforesaid processing at step S10 as the need arises.

Then, in the print order receiving system, the print out apparatus 40 supplies a print ending control signal C37 indicating the ending of the printing of an image together with the generated later printed matter PRL to the shipping terminal 50. As a result, in the print order receiving system, at step S35, the shipping terminal 50 performs predetermined shipping processing, and the later printed matter PRL is shipped to the user. The user, at step S36, receives the shipped later printed matter PRL, and the series of processing is terminated.

As described above, in the print order receiving system, a user can reorder and receive a later printed matter PRL of image data based on captured image data PID obtained by the imaging with the imaging apparatus 10.

As described above, the print order receiving system shown as a first embodiment of the present invention intensively stores various kinds of information concerning ordering together with captured image data PID obtained by previous imaging, and supplies the stored information together with the captured image data PID through a network. Thereby, a user can reorder the later printed matter PRL of the image data based on the captured image data PID obtained by previous imaging. Moreover, the print order receiving system enables an business operator to establish the imaging apparatus 10 at a plurality of places and to establish various kinds of apparatus other than the imaging apparatus 10 intensively, which enables the business operator to increase the operation efficiency of the print out apparatus 40 and to collect the expense of equipment in a short period.

Next, a description is given to a second embodiment of the present invention. The print order receiving system has a configuration basically similar to that of the print order receiving system shown as the first embodiment. The print order receiving system of the second embodiment differs from that of the first embodiment in receiving not only a reorder from a user terminal but also an order from imaging apparatus with its order receiving server. Accordingly, hereupon, each apparatus is designated by the same reference mark as that of the embodiment 1, and the detailed description thereof is omitted.

The print order receiving system is, as shown in FIG. 11, equipped with imaging apparatus 10, an output receiving server 20, an image storing server 30, a print out apparatus 40, a shipping terminal 50, an image processing server 60, a charging & settlement server 70, an order receiving server 80 and user terminals 90.

In the print order receiving system, a network connecting the user terminals 90 with the imaging apparatus 10, the image processing server 60, the charging & settlement server 70 and the order receiving server 80 is one such as the Internet. A network connecting the output receiving server 20, the image storing server 30, the print out apparatus 40, the shipping terminal 50, the image processing server 60 and the order receiving server 80 is one such as intranet. Then, in the print order receiving system, a plurality of imaging apparatus 10 are connected with the network and disposed at a plurality of locations. A plurality of user terminals 90 is connected with the network connecting the imaging apparatus 10, the image processing server 60, the charging & settlement server 70 and the order receiving server 80.

Each of the imaging apparatus 10, as mentioned above, includes an imaging section 11, an image computer 12, an imaging database 13 and a receipt-issuing 14.

As mentioned above, the imaging section 11 images an object and a background and the like as the need arises under the control of the imaging computer 12.

The image computer 12 performs the control of the imaging section 11 at the event of imaging, and supplies captured image data obtained by the imaging of the imaging section 11 not to the image storing server 30 but to the order receiving server 80. Moreover, the image computer 12 supplies the generated various kinds of information concerning imaging to the imaging database 13, and supplies the information not to the output receiving server 20 but to the order receiving server 80 as order data. Moreover, the image computer 12, as described above, controls the receipt-issuing 14 to make it issue a receipt.

The imaging database 13, as mentioned above, stores various kinds of information concerning imaging, the information being generated by the image computer 12, as a database. The various kinds of information concerning the imaging to be stored in the imaging database 13 are the same ones as shown in FIG. 2 previously.

The receipt-issuing 14, as described above, issues at least the aforesaid "Image number (Order Number)" and "Password" as a receipt under the control of the image computer 12. It is needless to say that, in the print order receiving system, as described above, a receipt issued by the receipt-issuing 14 may be delivered to a user on the spot as printed matter, or the receipt may be delivered to the user by the transmission of the receipt to the user terminal 90 as mail through a predetermined provider.

Each of such imaging apparatus 10 images at least an object upon user's payment of a rental fee in, for example, coins, and the imaging apparatus 10 generates the information concerning the imaging together with captured image data.

The output receiving server 20, as described above, includes a receiving computer 21 and a receiving database 22.

The receiving computer 21 generates the various kinds of information concerning order receiving on the basis of the order data supplied from not the imaging apparatus 10 but the order receiving server 80, and the receiving computer 20 supplies the generated information to the receiving database 22. Now, the receiving computer 21 does not generate the aforesaid reorder receiving inquiry data. Moreover, the receiving computer 21, as described above, generates a print instruction control signal for instructing the printing of an image. The receiving computer 21 supplies the generated print instruction control signal to the print out apparatus 40, and further the receiving computer 21 supplies an image requirement control signal indicating the requirement of image data to be printed to the image storing server 30. Furthermore, at the event of the re-receiving of an order, the receiving computer 21 receives re-receiving data from the order receiving server 80 to generate the various kinds of information concerning order receiving on the basis of the re-receiving data. Then the receiving computer 21 supplies the generated information to the receiving database 22.

The receiving database 22, as described above, stores the various kinds of information that concern order receiving and were generated by the receiving computer 21 as a database. The various kinds of information that concern order receiving and are to be stored in the receiving database 22 are the same ones shown in FIG. 3 previously. However, the various kinds of information concerning order receiving were generated by the receiving computer 21 on the basis of the order data and the re-receiving data, both being supplied from the order receiving server 80.

This output receiving server 20 performs the whole processing concerning the order receiving of a print out of an image, and generates the information concerning each order receiving.

The image storing server 30, as described above, includes an image computer 31 and an image database 32.

The image computer 31 receives the captured image data stored in the order receiving server 80 temporarily and makes the image database 32 store the received captured image data. Moreover, the image computer 31, as described above, makes the image database 32 store various kinds of image data besides the captured image data. Moreover, the image computer 31 generates various kinds of information concerning image data corresponding to the stored image data. The image computer 31 supplies the generated information to the image database 32 for making the image database 32 store the supplied information. Furthermore, the image computer 31, as described above, reads the image data from the image database 32 which image data were required corresponding to an image requirement control signal supplied from the output receiving server 20 and the print out apparatus 40. The image computer 31 supplies the read image data to the print out apparatus 40. Furthermore, the image computer 31, as described above, reads the image data from the image database 32 from which image data are required corresponding to the image requirement control signal supplied from the image processing server 60. The image computer 31 supplies the read image data to the image processing server 60.

The image database 32, as described above, stores various kinds of image data under the control of the image computer 31, and stores various kinds of information that concern image data and are generated by the image computer 31 as a database. The various kinds of information that concern the image data and are stored in the image database 32 are the same ones as shown in FIG. 4 previously.

This image storing server 30 stores various kinds of image data, and generates the information concerning image data.

The print out apparatus 40, as described above, includes an output computer 41 and a printer 42.

As described above, when a printing instruction control signal instructing the printing of an image is supplied to the output computer 41 from the output receiving server 20, the output computer 41 supplies an image requirement control signal indicating the requirement of the image data to be printed to the image storing server 30, and the output computer 41 makes the printer 42 print the image data read in response to the image requirement control signal. When the printing ends, the output computer 41 supplies a print ending control signal indicating the ending of the printing of the image together with the generated printed matter to the shipping terminal 50.

The printer 42, as described above, prints an image under the control of the output computer 41 to discharge it as printed matter to the outside. The printed matter is supplied to the shipping terminal 50 by the output computer 41.

This print out apparatus 40 prints the designated image, and generates printed matter as a final shipping object.

The shipping terminal 50, as described above, includes a shipping computer 51.

As described above, when a print ending control signal indicating the end of the printing of the image is supplied to the shipping computer 51 from the print out apparatus 40, the shipping computer 51 performs various kinds of processing for the preparation for shipment. When the preparation for the shipping by the shipping computer 51 is completed, the printed matter is shipped. The shipping computer 51 generates shipping information indicating the shipping of the printed matter, and records the information in, for example, a hard disk drive or the like, or displays the information on a display.

This shipping terminal 50 performs various kinds of processing such as the generation of various kinds of information necessary for the shipping of printed matter to a user being a right addressee.

The image processing server 60, as described above, includes a processing computer 61.

As described above, when a preview display instruction control signal for instructing the not shown display of the user terminal 90 to display an image is supplied to the processing computer 61 from the order receiving server 80, the processing computer 61 supplies an image requirement control signal indicating the requirement of the image data to be displayed to the image storing server 30. Then, the processing computer 61, as described above, processes the image data that were read in response to the image requirement control signal as the need arises, and the processing computer 61 supplies the read image data to the user terminal 90 as a preview image to make the displaying of the preview image.

This image processing server 60 processes image data to generate a preview image for displaying an image similar to the printed matter.

The charging & settlement server 70, as described above, includes a charging computer 71 and a charging database 72.

As described above, when a charging instruction control signal for instructing charging is supplied to the charging computer 71 from the order receiving server 80, the charging computer 71 requires payment information, which is the information concerning a payment method necessary for the payment of charge, of the user terminal 90. Then, when the charging computer 71, as described above, receives the payment information from the user terminal 90 as reorder data, the charging computer 71 executes its charging processing. And then, the charging computer 71 supplies a payment completion control signal indicating the completion of payment to the user terminal 90. Moreover, the charging computer 71 supplies a charging completion control signal indicating the completion of the charging processing to the order receiving server 80. The charging computer 71 generates various kinds of information concerning the charging and the settlement at the event of the processing to make the charging database 72 store the information.

The charging database 72, as described above, stores various kinds of information that concern charging and settlement and are generated by the charging computer 71 as a database. The various kinds of information to be stored in the charging database 71 are the same as ones shown in FIG. 5 previously.

This charging & settlement server 70 carries the whole processing concerning charging and settlement, and generates information concerning charging and settlement.

The order receiving server 80, as described above, includes an order computer 81 and an order database 82.

When order data generated by the imaging apparatus 10 are supplied to the order computer 81, the order computer 81 makes the order database 82 store the order data and generates various kinds of information concerning the receiving of an order on the basis of the order data. Then, the order computer 81 supplies the information to the order database 82. Moreover, when the captured image data are supplied from the imaging apparatus 10 to the order computer 81, the order computer 81 supplies the captured image data to the order database 82 to make the order database 82 store the captured image data temporarily. And then, the order computer 81 supplies the stored captured image data to the image storing server 30. Furthermore, the order computer 81 supplies order receiving data indicating the contents of the order to the output receiving server 20 on the basis of the order data.

Then, when a connection requirement is issued from the user terminal 90 to the order computer 81, the order computer 81 performs the same processing as one described above. In other words, the order computer 81 makes a not shown display of the user terminal 90 display a predetermined initial screen for reordering. When various kinds of information indicating reordered contents are supplied to the order computer 81 from the user terminal 90 as reorder data, the order computer 81 performs various kinds of processing concerning reordering on the basis of the reorder data. To put it specifically, the order computer 81 performs user inquiry by inspecting the conformity between the order data and the reorder data when a requirement of a reorder is transmitted from the user terminal 90. When the user is an eligible person as a result of the inquiring, the order computer 81 makes the displaying of a predetermined menu screen for reordering on the display screen of the user terminal 90. According to a selection operation of the user terminal 90 with the menu screen, the order computer 81 supplies the aforesaid preview display instruction control signal for making the display of the user terminal 90 display a preview image to the image processing server 60. Then, when a confirmation control signal indicating an order after the confirmation of the preview image is supplied to the order computer 81 from the user terminal 90, the order computer 81 makes the display of the user terminal 90 display a predetermined payment method screen concerning the payment of a charge. In response to a selection operation of the user terminal 90 with the payment method screen, the order computer 81 supplies the aforesaid charging instruction control signal instructing charging to the charging & settlement server 70. Moreover, when the aforesaid charging completion control signal indicating the completion of charging processing is supplied to the order computer 81 from the charging & settlement server 70, the order computer 81 supplies a reception completion control signal indicating the completion of the reception of the reorder to the user terminal 90, and further the order computer 81 supplies the aforesaid re-receiving data indicating the contents of the reorder to the output receiving server 20. The order computer 81 generates the information concerning the reorder as the aforesaid various kinds of information concerning the reception of the order, and the information is supplied to the order database 82.

The order database 82, as described above, temporarily stores the captured image data and stores various kinds of information that were generated by the order computer 81 and concern the reception of an order as a database under the control of the order computer 81.

The various kinds of information concerning the reception of an order to be stored in the order database 82 are composed of, for example, as shown in FIG. 12, the elements similar to those shown in FIG. 6 previously. However, the system of the present embodiment also receives an order from the imaging apparatus 10, the ordered prices of captured image data themselves, the captured image data being obtained by the imaging of the imaging apparatus 10, are further added.

This order receiving server 80 receives orders including reorders of images and generates the information concerning the reception of the orders.

The user terminal 90, as described above, includes a user computer 91.

The user computer 91 performs the procedures such as the display of a preview image or payment by performing the processing similar to the aforesaid one through a predetermined provider at the event of performing a reorder of an image.

This user terminal 90 works as a user interface at the event of reordering, and the user terminal 90 is also a communication terminal enabling a user to perform the delivery of information to a business operator through a network.

Figure 13:
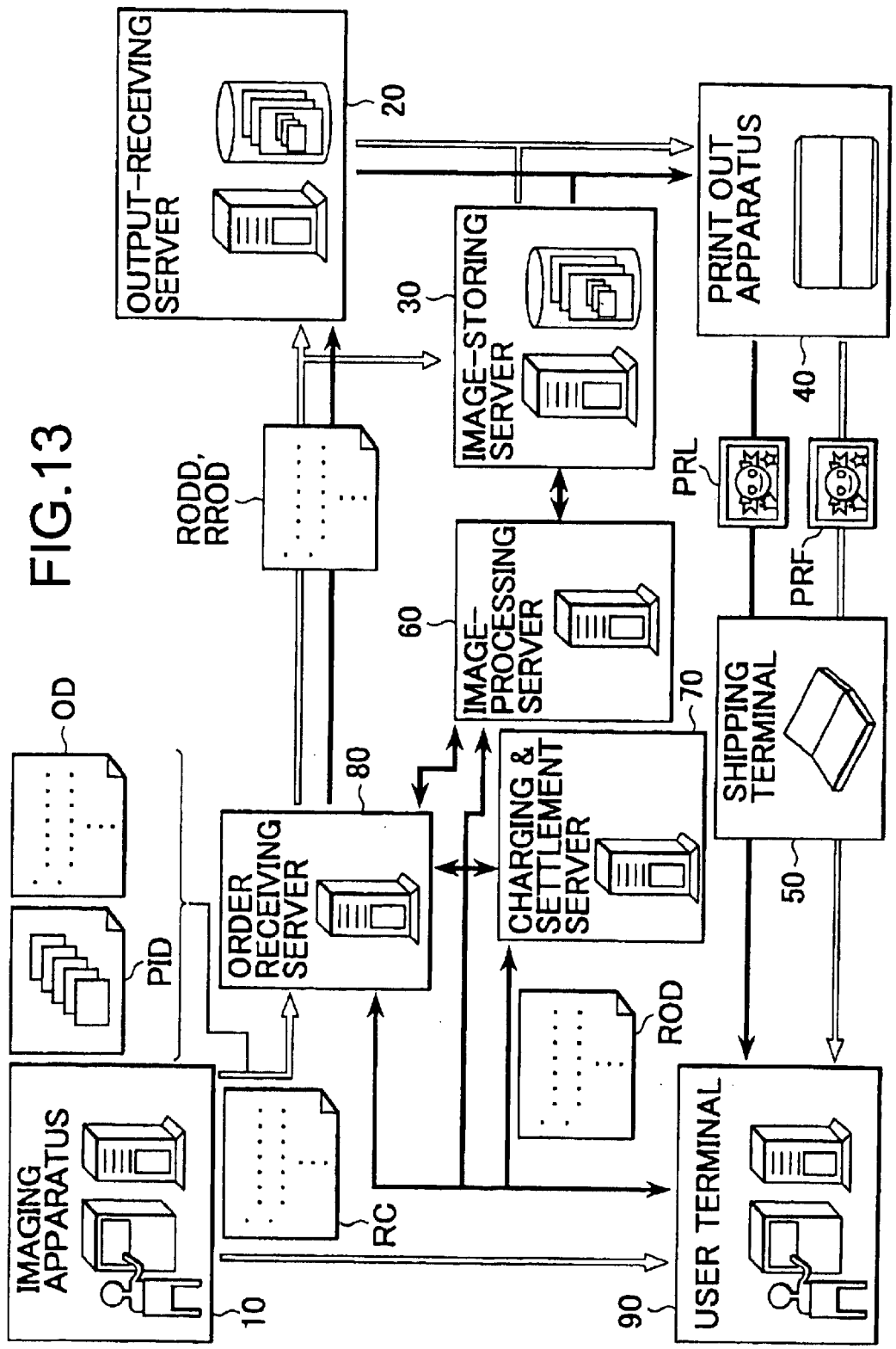
FIG. 13 is a diagram for illustrating information handed over between each apparatus in the print order receiving system.

Now, the print order receiving system composed of each apparatus like this performs the delivery of information between each apparatus as shown in FIG. 13, and receives an order of a print output of an image. In addition, in FIG. 13, white arrows indicate information delivered in a process for ordering a print output of an image by the imaging of the imaging apparatus 10, and black arrows indicate information to be delivered in a process for a later reorder based on a captured image data obtained by previous imaging. Moreover, in the following, a printed matter shipped in the process indicated by the white arrows is called as "initial printed matter", and a printed matter in the process indicated by the black arrows is called as "later printed matter" as the need arises.

In the print order receiving system, when a user first performs the imaging with the imaging apparatus 10 by paying a rental fee, for example, in coins or the like, the aforesaid order data OD generated by the imaging apparatus 10 and the captured image data PID obtained by the imaging with the imaging apparatus 10 are together supplied to the order receiving server 80. Moreover, in the print order receiving system, the aforesaid receipt RC issued by the imaging apparatus 10 is directly delivered to the user or is delivered to the user through the user terminal 90.

In the print order receiving system, when the order of the print output of the captured image data PID is received in such a way, the captured image data PID stored in the order receiving server 80 temporarily are supplied to the image storing server 30. Moreover, in the print order receiving system, the order receiving server 80 generates the aforesaid ordered data RODD, and the ordered data Rodd are supplied to the output receiving server 20. Then, in the print order receiving system, the image storing server 30 and the print out apparatus 40 is actuated in response to a print instruction from the output receiving server 20 to generate the initial printed matter PRF. The initial printed matter PRF is shipped to the user through the shipping terminal 50.

In the print order receiving system, the delivery of information is performed in such a way, and then the initial printed mater PRF of the captured image data PID reaches the user.

Moreover, in the print order receiving system, when a reorder of later printed matter of image data based on the captured image data PID is performed, a user accesses the order receiving server 80 with the user terminal 90 at first. Then, the user transmits reorder data ROD to the order receiving server 80 with the user terminal 90.

In the print order receiving system, when the later printed matter of the image data based on the captured image data PID is ordered in such a way, the image processing server 60 reads the captured image data PID, foreground image data and/or background image data, all being designated by the image storing server 30, and predetermined image processing is performed to the read image data. The image data obtained as a result of the processing are downloaded to the user terminal 90 as a preview image, and are displayed on the display of the user terminal 90. In the print order receiving system, when a user confirms a preview image, the payment information as the aforesaid reorder data ROD is delivered between the user terminal 90 and the charging & settlement server 70, and thereby the charging processing is performed. In the print order receiving system, the order receiving server 80 generates the aforesaid re-receiving data RROD corresponding to the charging processing. By the supply of the re-receiving data RROD to the output receiving server 20, the order of the later printed matter is re-received. Then, in the print order receiving system, the image storing server 30 and the print out apparatus 40 operate to generate the later printed matter PRL in response to a print instruction from the output receiving server 20. The later printed matter PRL is shipped to the user through the shipping terminal 50.

In the print order receiving system, the delivery of information is performed in such a way, and then the later printed matter PRL of the image data based on the captured image data PID reaches the user.

Figure 14:
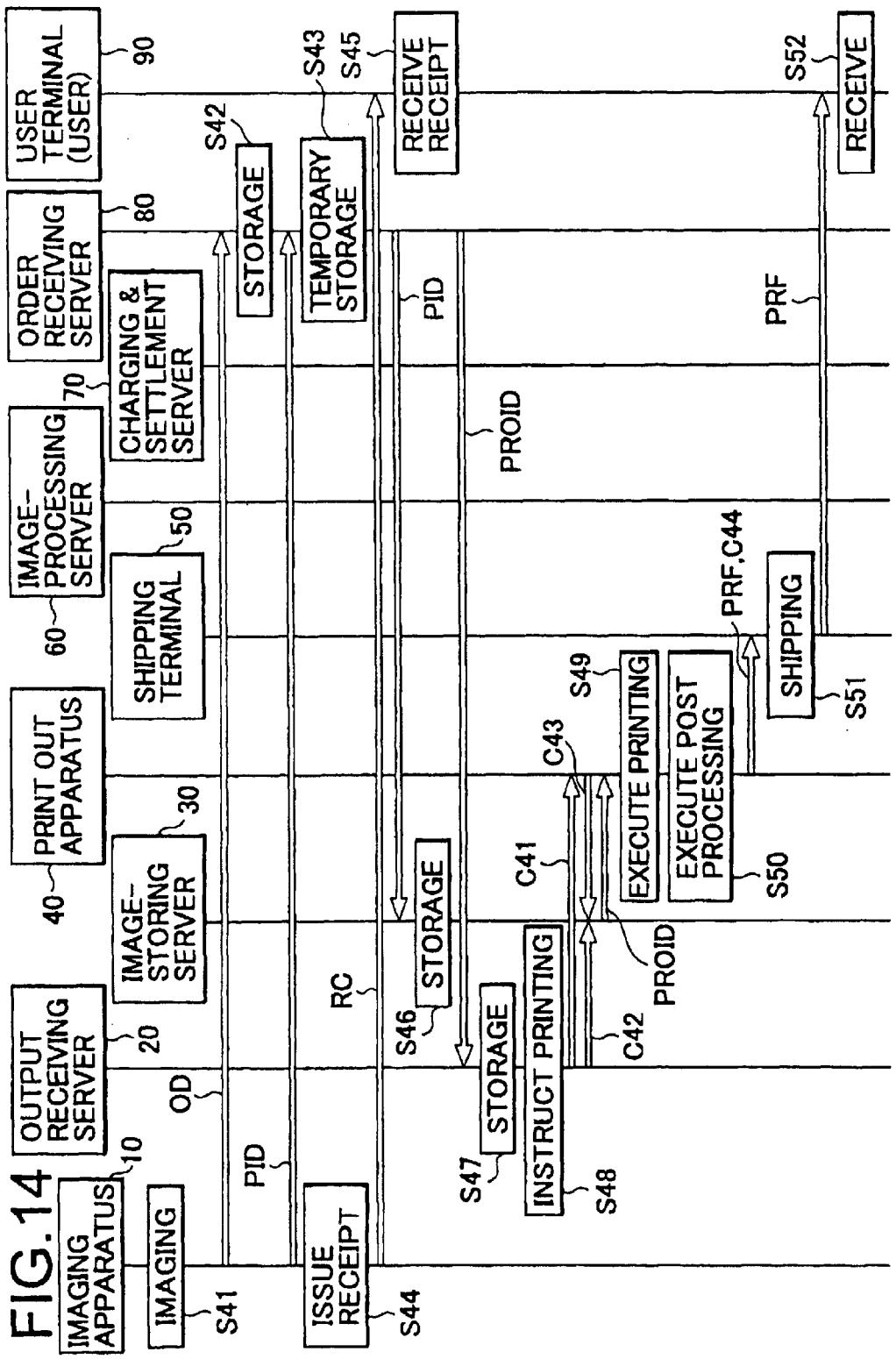
FIG. 14 is a diagram for illustrating a series of the processing processes in the print order receiving system, illustrating the process of ordering a print output of an image by imaging with the imaging apparatus.

In more concrete terms, the print order receiving system receives an order of a print output of a captured image data PID by performing a series of processing as shown in FIG. 14, and the system receives a reorder of a print output of image data based on the captured image data PID by performing the processing similar to that shown in FIG. 9 and FIG. 10 previously. In addition, in FIG. 14, too, the contents of the processing of each apparatus in the print order receiving system are shown, and the timing of the delivery of information between each apparatus is also shown. Moreover, the user terminal 90 in FIG. 14 may designate an actual user oneself.

In other words, as the process of ordering a print output of an image by imaging with the imaging apparatus 10 in the print order receiving system, for example, when a user pays a fee against the imaging apparatus 10, as shown in FIG. 14, at step S41, the imaging apparatus 10 performs the imaging of an object. At this stage, in the print order receiving system, order data OD are generated by the imaging apparatus 10 to be supplied to the order receiving server 80. Moreover, in the print order receiving system, captured image data PID are supplied from the imaging apparatus 10 to the order receiving server 80. With this, in the print order receiving system, at step S42, the order data OD are stored by the order receiving server 80. Moreover, at step S43, the order receiving server 80 stores the captured image data PID temporarily.

Next, in the print order receiving system, at step S44, the imaging apparatus 10 issues a receipt RC. The user or the user terminal 90, at step S45, receives the receipt RC.

Next, in the print order receiving system, the order receiving server 80 supplies the captured image data PID to the image storing server 30. As a result, in the print order receiving system, at step S46, the image storing server 30 stores the captured image data PID. Moreover, in the print order receiving system, the order receiving server 80 supplies the ordered data RODD to the output receiving server 20. With this, in the print order receiving system, at step S47, the output receiving server 20 stores the ordered data ROID.

In succession, in the print order receiving system, at step S48, the output receiving server 20 generates a print instruction control signal C41 for instructing the print of an image to supply the print instruction control signal C41 to the print out apparatus 40. Moreover, in the print order receiving system, image requirement control signals C42 and C43 indicating the requirement of image data to be printed are supplied from the output receiving server 20 and the print out apparatus 40, respectively, to the image storing server 30. With this, in the print order receiving system, the image data PRID to be printed corresponding to the image requirement control signals C2 and C3 are read from the image storing server 30 to be supplied to the print out apparatus 40.

Next, in the print order receiving system, at step S49, the print out apparatus 40 performs the printing processing of image data PRID, and at step S50, the post processing of the printing similar to the processing at the aforesaid step S10 is performed as the need arises.

Then, in the print order receiving system, the print out apparatus 40 supplies a print ending control signal C44 indicating the ending of the printing of the image together with the generated initial printed matter PRF to the shipping terminal 50. With this, in the print order receiving system, at step S51, the shipping terminal 50 performs predetermined shipping processing to ship the initial printed matter PRF to a user. The user receives the shipped initial printed matter PRF at step S52, and the series of processing is terminated.

As described above, in the print order receiving system, a user can receive an initial printed matter PRF of captured image data PID obtained by imaging with the imaging apparatus 10. In addition, in the print order receiving system, the process for reordering later printed matter PRL later on the basis of a captured image data PID is performed through a series of processing as shown in FIG. 9 and FIG. 10 previously.

As described above, the print order receiving system shown as the second embodiment of the present invention, similarly to the print order receiving system shown as the first embodiment, intensively stores various kinds of information concerning ordering together with captured image data PID obtained by previous imaging, and supplies the stored information together with the captured image data PID through a network. Thereby, a user can reorder the later printed matter PRL of the image data based on the captured image data PID obtained by previous imaging. Moreover, the print order receiving system enables an business operator to establish the imaging apparatus 10 at a plurality of places and to establish various kinds of apparatus other than the imaging apparatus 10 intensively, which enables the business operator to increase the operation efficiency of the print out apparatus 40 and to collect the expense of equipment in short period. In particular, the print order receiving system intensively receives a first order and a reorder with the order receiving server 80, and thereby the system can deal with both the first order and the reorder by generating similar databases. Consequently, the simplification of processing can be attained.

Next, a description is given to a third embodiment of the present invention. The print order receiving system has a configuration basically similar to that of the print order receiving system shown as the first embodiment. The print order receiving system of the third embodiment differs from that of the first embodiment in delivering printed matter of captured image data obtained by imaging with imaging apparatus to a user on the spot. Accordingly, hereupon, each apparatus is designated by the same reference mark as that of the first embodiment, and the detailed description thereof is omitted.

Figure 15:
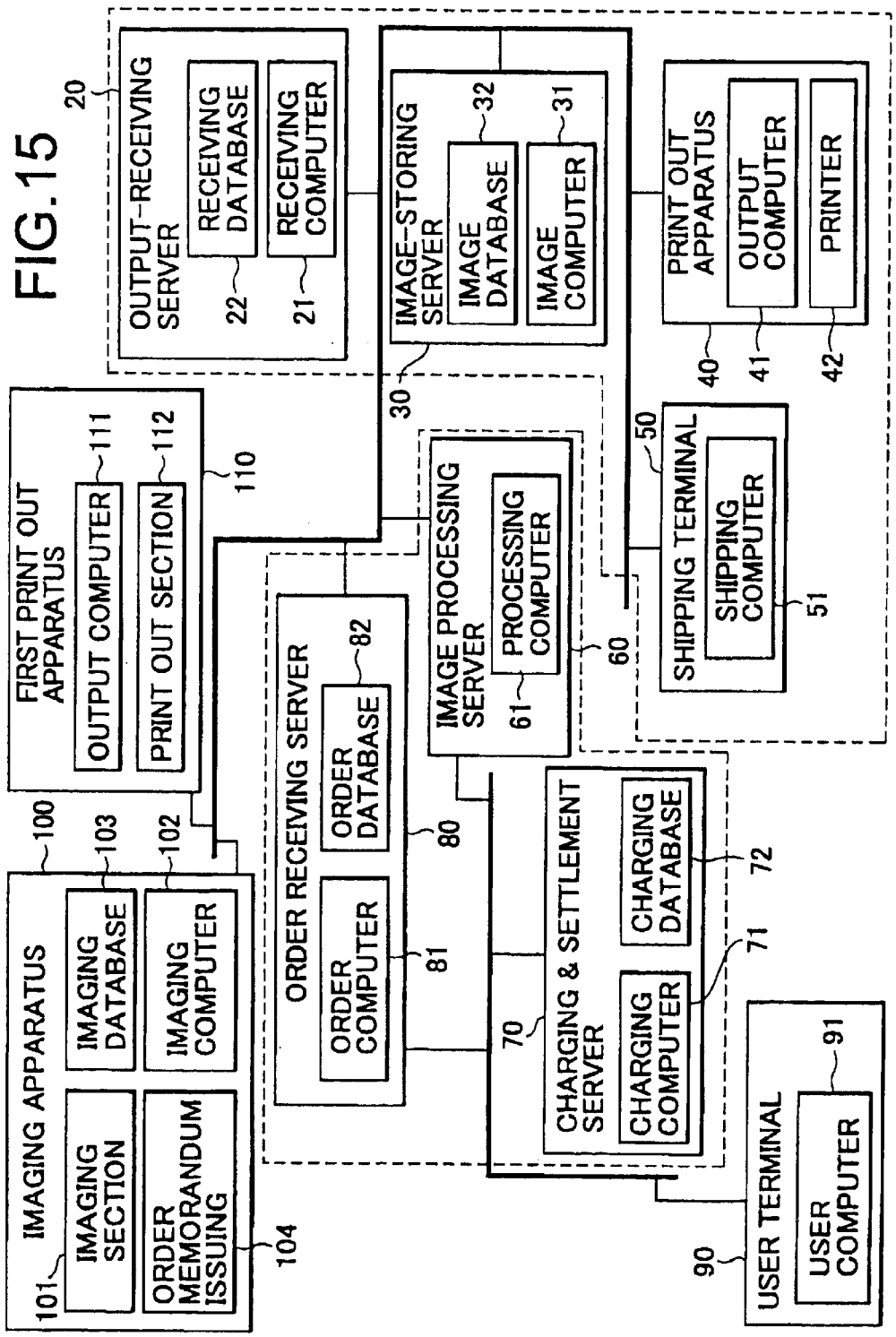
FIG. 15 is a bock diagram illustrating the configuration of a print order receiving system as a third embodiment of the invention.

The print order receiving system is, as shown in FIG. 15, equipped with imaging apparatus 100 for imaging at least an object severally, first print out apparatus 110 and a second print out apparatus 120, both printing an image to output printed matter, besides an output receiving server 20, an image storing server 30, a shipping terminal 50, an image processing server 60, a charging & settlement server 70, an order receiving server 80 and user terminals 90.

In the print order receiving system, a network connecting the user terminals 90 with the image processing server 60, the charging & settlement server 70 and the order receiving server 80 is one such as the Internet. A network connecting the imaging apparatus 100, the output receiving server 20, the image storing server 30, the shipping terminal 50, the image processing server 60, the order receiving server 80, the first print out apparatus 110 and the second print out apparatus 120 is one such as intranet. Then, in the print order receiving system, a plurality of imaging apparatus 100 and a plurality of first print out apparatus 110 are connected with the network and disposed at a plurality of locations. A plurality of user terminals 90 is connected with the network connecting the image processing server 60, the charging & settlement server 70 and the order receiving server 80.

Each of the imaging apparatus 100 includes an imaging section 101, an image computer 102, an imaging database 103 and an order memorandum issuing 104 for issuing an order memorandum as a record of the order of a print output of an image.

Similarly to the aforesaid imaging section 11, the imaging section 101 images an object and a background and the like as the need arises under the control of the imaging computer 102. Hereupon, captured image data obtained by the imaging of the imaging section 101 are supplied to the image computer 102.

The image computer 102, similarly to the aforesaid image computer 12, performs the control of the imaging section 101 at the event of imaging, and supplies captured image data obtained by the imaging of the imaging section 101 to the image storing server 30. Moreover, the image computer 102 supplies the generated various kinds of information concerning imaging to the imaging database 103, and supplies the information to the output receiving server 20 as order data. Moreover, the image computer 102 generates a print instruction control signal for instructing the printing of an image to supply the generated print instruction control signal to the first print out apparatus 110. The image computer 102 also supplies the captured image data obtained by the imaging of the imaging section 101 to the first print out apparatus 110. Furthermore, the image computer 102 controls the order memorandum issuing 104 to make it issue an order memorandum.

The imaging database 103, similarly to the aforesaid imaging database 13, stores various kinds of information concerning imaging, the information being generated by the image computer 102, as a database. The various kinds of information concerning the imaging to be stored in the imaging database 103 are the same as ones shown in FIG. 2 previously.

The order memorandum issuing 104 issues at least the aforesaid "Image number (Order Number)" and "Password" as an order memorandum under the control of the image computer 102. In other words, the order memorandum has the contents similar to those of the aforesaid receipt. The order memorandum records the information for certifying the contents of an order. A user reorders printed matter on the basis of the information recorded in the order memorandum. In addition, in the print order receiving system, similarly to the aforesaid receipt, an order memorandum printed and issued by the order memorandum issuing 104 may be delivered to a user on the spot, or the order memorandum may be delivered to the user by the transmission of the order memorandum to the user terminal 90 through a network by the use of the so-called mail function. In the latter case, by the user's input of the address of a user terminal 90 intended as an addressee of the order memorandum with a not shown operating section, the order memorandum issued by the order memorandum issuing 104 is transmitted to the user terminal 90 designated by the address through a predetermined provider under the control of the image computer 102.

Each of such imaging apparatus 100 images at least an object by the user's payment of a rental fee in, for example, coins, and the imaging apparatus 100 generates the information concerning the imaging together with captured image data. The imaging apparatus 100 controls the first print out apparatus 110 to make the first print out apparatus 110 output printed matter.

The output receiving server 20, as described above, includes a receiving computer 21 and a receiving database 22.

The receiving computer 21 generates the various kinds of information concerning order receiving on the basis of the order data supplied from the imaging apparatus 100, and the receiving computer 21 supplies the generated information to the receiving database 22. Now, the receiving computer 21, as described above, generates the information to be necessary for the receiving of a reorder of the print output of an image on the basis of order data for the preparation for a user's later reorder of the printed matter of the image corresponding to the order data. Then, the receiving computer 21 supplies the information to the order receiving server 80 as reorder receiving inquiry data. Moreover, the receiving computer 21, as described above, generates a print instruction control signal for instructing the printing of an image. The receiving computer 21 supplies the generated print instruction control signal to the second print out apparatus 120, and further the receiving computer 21 supplies an image requirement control signal indicating the requirement of image data to be printed to the image storing server 30. Furthermore, at the event of the reorder receiving, the receiving computer 21 receives re-receiving data from the order receiving server 80 to generate the various kinds of information concerning order receiving on the basis of the re-receiving data. Then the receiving computer 21 supplies the generated information to the receiving database 22.

The receiving database 22, as described above, stores the various kinds of information that concern order receiving and were generated by the receiving computer 21 as a database. The various kinds of information that concern order receiving and are to be stored in the receiving database 22 are the same ones as shown in FIG. 3 previously. However, the various kinds of information concerning order receiving were generated by the receiving computer 21 on the basis of the order data supplied from the imaging apparatus 100 and the re-receiving data supplied from the order receiving server 80.

This output receiving server 20 performs the whole processing concerning the order receiving of a print out of an image, and generates the information concerning each order receiving.

The image storing server 30, as described above, includes an image computer 31 and an image database 32.

The image computer 31 receives the captured image data obtained by the imaging of the imaging apparatus 100, and the image computer 31 makes the image database 32 store the received captured image data. Moreover, the image computer 31, as described above, makes the image database 32 store various kinds of image data besides the captured image data. Moreover, the image computer 31 generates various kinds of information concerning the stored image data corresponding to the image data. The image computer 31 supplies the generated information to the image database 32 for making the image database 32 store the supplied information. Furthermore, the image computer 31, as described above, reads the image data from the image database 32 from which image data are required corresponding to an image requirement control signal supplied from the image processing server 60. The image computer 31 supplies the read image data to the image processing server 60. Furthermore, the image computer 31, as described above, reads the image data from the image database 32 which image data were required corresponding to the image requirement control signal supplied from the output receiving server 20 and the second print out apparatus 120. The image computer 31 supplies the read image data to the second print out apparatus 120.

The image database 32, as described above, stores various kinds of image data under the control of the image computer 31, and stores various kinds of information that concern image data and are generated by the image computer 31 as a database. The various kinds of information that concern the image data and are stored in the image database 32 are the same ones as shown in FIG. 4 previously.

This image storing server 30 stores various kinds of image data, and generates the information concerning image data.

The first print out apparatus 110, similarly to the print out apparatus 40, includes an output computer 111 and a print output 112.

When a printing instruction control signal instructing the printing of an image is supplied to the output computer 111 from the imaging apparatus 100, the output computer 111 makes the print output 112 print the image data generated by the predetermined image processing such as the synthesis of the captured image data supplied from the imaging apparatus 100 and the desired image data supplied from the image storing server 30.

The print output 112 prints an image under the control of the output computer 111 to discharge it as printed matter to the outside. The printed matter is delivered to a user as it is.

This first print out apparatus 110 prints the designated image, and generates printed matter to deliver it to a user.

The second print out apparatus 120, similarly to the print out apparatus 40, includes an output computer 121 and a print output 122.

When a printing instruction control signal instructing the printing of an image is supplied to the output computer 121 from the output receiving server 20, the output computer 121 supplies an image requirement control signal indicating the requirement of the image data to be printed to the image storing server 30. Then, the output computer 121 makes the print output 122 print the image data read corresponding to the image requirement control signal. And then, when the printing ends, the output computer 121 supplies a print ending control signal indicating the end of the printing of an image to the shipping terminal 50 together with generated printed matter.

The print output 122, as described above, prints an image under the control of the output computer 121 to discharge it as printed matter to the outside. The printed matter is supplied to the shipping terminal 50 by the output computer 121.

This second print out apparatus 120 prints the designated image, and generates printed matter as final shipping goods.

The shipping terminal 50, as described above, includes a shipping computer 51.

When a print ending control signal indicating the end of the printing of an image is supplied to the shipping computer 51 from the second print out apparatus 120, the shipping computer 51 performs various kinds of processing for the preparation for shipment. When the preparation for the shipping by the shipping computer 51 is completed, the printed matter is shipped. The shipping computer 51 generates shipping information indicating the shipping of the printed matter, and records the information in, for example, a hard disk drive or the like, or displays the information on a display.

This shipping terminal 50 performs various kinds of processing such as the generation of various kinds of information necessary for the shipping of printed matter to a user being a right addressee.

The image processing server 60, as described above, includes a processing computer 61.

As described above, when a preview display instruction control signal for instructing the not shown display of the user terminal 90 to display an image is supplied to the processing computer 61 from the order receiving server 80, the processing computer 61 supplies an image requirement control signal indicating the requirement of the image data to be displayed to the image storing server 30. Then, the processing computer 61, as described above, processes the image data that were read in response to the image requirement control signal as the need arises, and the processing computer 61 supplies the read image data to the user terminal 90 as a preview image to make the displaying of the preview image.

This image processing server 60 processes image data to generate a preview image for displaying an image similar to the printed matter.

The charging & settlement server 70, as described above, includes a charging computer 71 and a charging database 72.

As described above, when a charging instruction control signal for instructing charging is supplied to the charging computer 71 from the order receiving server 80, the charging computer 71 requires payment information, which is the information concerning a payment method necessary for the payment of charge, of the user terminal 90. Then, when the charging computer 71, as described above, receives the payment information from the user terminal 90 as reorder data, the charging computer 71 executes its charging processing. And then, the charging computer 71 supplies a payment completion control signal indicating the completion of payment to the user terminal 90. Moreover, the charging computer 71 supplies a charging completion control signal indicating the completion of the charging processing to the order receiving server 80. The charging computer 71 generates various kinds of information concerning the charging and the settlement at the event of the processing to make the charging database 72 store the information.

The charging database 72, as described above, stores the various kinds of information that concern charging and settlement and are generated by the charging computer 71 as a database. The various kinds of information to be stored in the charging database 71 are the same as ones shown in FIG. 5 previously.

This charging & settlement server 70 carries the whole processing concerning charging and settlement, and generates information concerning charging and settlement.

The order receiving server 80, as described above, includes an order computer 81 and an order database 82.

As described above, when reorder receiving inquiry data, which were generated by the output receiving server 20 for the preparation for a case in which a user would later reorder the printed matter of an image corresponding to order data, are supplied to the order computer 81, the order computer 81 generates various kinds of information concerning the receiving of an order including a reorder, and the order computer 81 supplies the generated information to the order database 82.

Then, when a connection requirement is issued from the user terminal 90 to the order computer 81, the order computer 81 performs the same processing as one described above. In other words, the order computer 81 makes a not shown display of the user terminal 90 display a predetermined initial screen for reordering. When various kinds of information indicating reordered contents are supplied to the order computer 81 from the user terminal 90 as reorder data, the order computer 81 performs various kinds of processing concerning reordering on the basis of the reorder data. To put it specifically, the order computer 81 performs user inquiry by the use of order data when a requirement of a reorder is transmitted from the user terminal 90. When the user is an eligible person as a result of the inquiring, the order computer 81 makes the displaying of a predetermined menu screen for reordering on the display screen of the user terminal 90. According to a selection operation of the user terminal 90 with the menu screen, the order computer 81 supplies the aforesaid preview display instruction control signal for making the display of the user terminal 90 display a preview image to the image processing server 60. Then, when a confirmation control signal indicating an order after the confirmation of the preview image is supplied to the order computer 81 from the user terminal 90, the order computer 81 makes the display of the user terminal 90 display a predetermined payment method screen concerning the payment of a charge. In response to a selection operation of the user terminal 90 with the payment method screen, the order computer 81 supplies the aforesaid charging instruction control signal instructing charging to the charging & settlement server 70. Moreover, when the aforesaid charging completion control signal indicating the completion of charging processing is supplied to the order computer 81 from the charging & settlement server 70, the order computer 81 supplies a reception completion control signal indicating the completion of the reception of the reorder to the user terminal 90, and further the order computer 81 supplies the aforesaid re-receiving data indicating the contents of the reorder to the output receiving server 20. The order computer 81 generates the information concerning the reorder as the aforesaid various kinds of information concerning the reception of the order, and the information is supplied to the order database 82.

The order database 82, as described above, temporarily stores the captured image data and stores various kinds of information that were generated by the order computer 81 and concern the reception of an order as a database under the control of the order computer 81. The various kinds of information that are to be stored in the order database 82 and concern the reception of an order are the same as those shown in FIG. 6 previously.

This order receiving server 80 receives orders including reorders of images and generates the information concerning the reception of the orders.

The user terminal 90, as described above, includes a user computer 91.

The user computer 91 performs the procedures such as the display of a preview image or payment by performing the processing similar to the aforesaid one through a predetermined provider at the event of performing a reorder of an image.

This user terminal 90 works as a user interface at the event of reordering, and the user terminal 90 is also a communication terminal enabling a user to perform the delivery of information between an business operator through a network.

Figure 16:
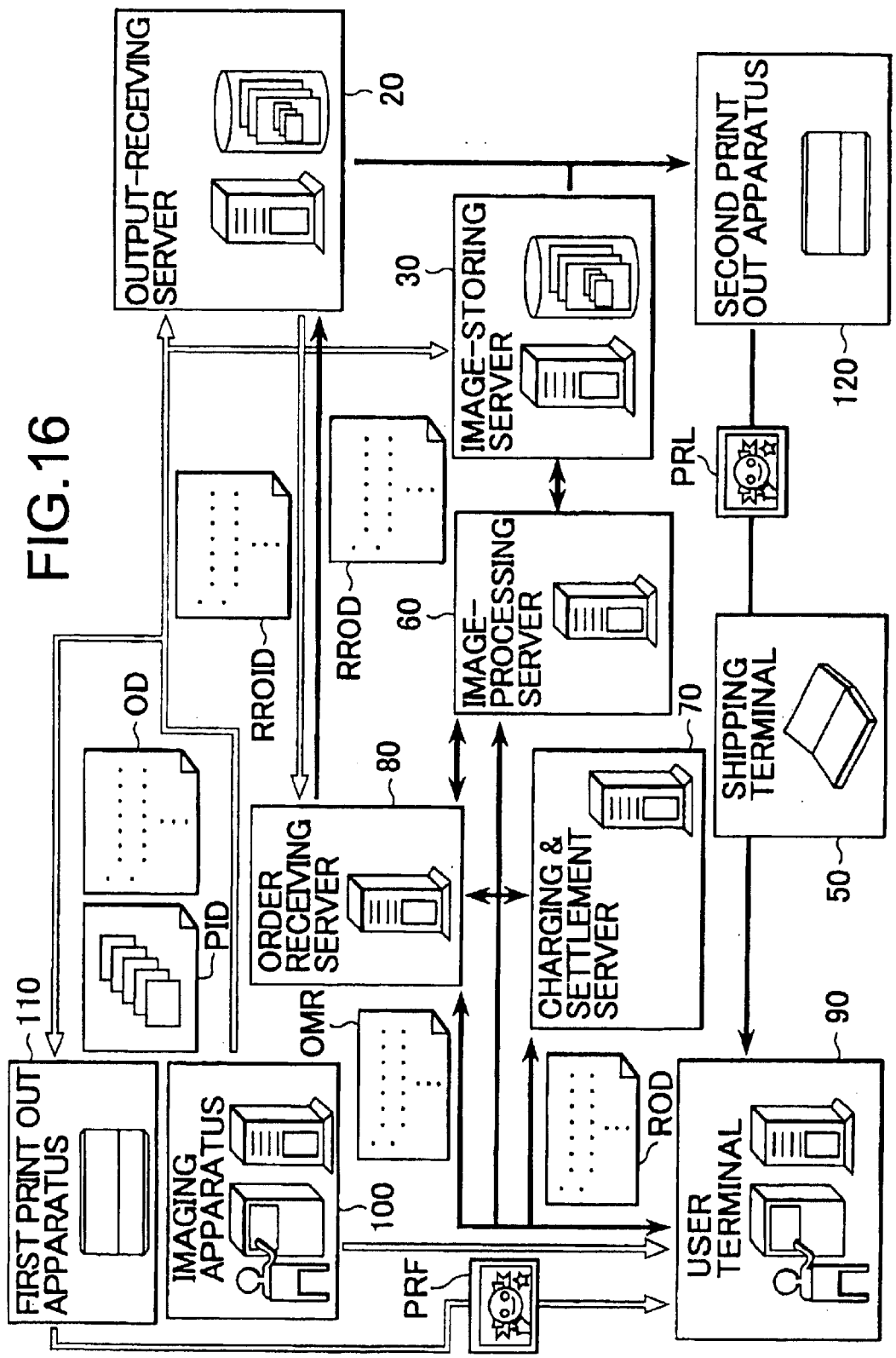
FIG. 16 is a diagram for illustrating information handed over between each apparatus in the print order receiving system.

Now, the print order receiving system composed of each apparatus like this performs the delivery of information between each apparatus as shown in FIG. 16, and receives an order of a print output of an image. In addition, in FIG. 16, white arrows indicate information delivered in a process for ordering a print output of an image by the imaging of the imaging apparatus 100, and black arrows indicate information to be delivered in a process for a later reorder based on a captured image data obtained by previous imaging. Moreover, in the following, a printed matter shipped in the process indicated by the white arrows is called as "initial printed matter", and a printed matter in the process indicated by the black arrows is called as "later printed matter" as the need arises.

In the print order receiving system, when a user first performs the imaging with the imaging apparatus 100 by paying a rental fee, for example, in coins or the like, the aforesaid order data OD generated by the imaging apparatus 100 are supplied to the output receiving server 20. Moreover, the captured image data PID obtained by the imaging of the imaging apparatus 100 are supplied to the image storing server 30 and the first print out apparatus 110. Then, in the print order receiving system, when the order of the print output of the captured image data PID is received in such a way, the first print out apparatus 110 is operated in response to a printing instruction from the imaging apparatus 100. The initial printed matter PRF generated by the first print out apparatus 110 is delivered to a user on the spot. Moreover, in the print order receiving system, the aforesaid order memorandum OMR is directly delivered to a user, or the order memorandum OMR is delivered to the user through the user terminal 90. Moreover, in the print order receiving system, the output receiving server generates the aforesaid reorder receiving inquiry data RROID to supply the reorder receiving inquiry data RROID to the order receiving server 80.

In the print order receiving system, the delivery of information is performed in such a way, and then the initial printed mater PRF of the captured imaged data PID reaches the user.

Moreover, in the print order receiving system, when a reorder of later printed matter of image data based on the captured image data PID is performed, a user accesses the order receiving server 80 with the user terminal 90 at first. Then, the user transmits reorder data ROD to the order receiving server 80 with the user terminal 90. In other words, in the print order receiving system, by the user's generation of the reorder data ROD on the basis of the information recorded in the aforesaid order memorandum OMR, the captured image data PID to be a basis of the image to be reordered are specified, and that the user is an eligible person of a right of accessing the captured image data PID is certified on the basis of the aforesaid reorder receiving inquiry data RROID, more specifically, the aforesaid various kinds of information concerning the reception of an order including a reorder which information was generated on the basis of the reorder receiving inquiry data RROID.

In the print order receiving system, when the later printed matter of the image data based on the captured image data PID is ordered in such a way, the image processing server 60 reads the captured image data PID, foreground image data and/or background image data, all being designated by the image storing server 30, and predetermined image processing is performed to the read image data. The image data obtained as a result of the processing are downloaded to the user terminal 90 as a preview image, and are displayed on the display of the user terminal 90. In the print order receiving system, when a user confirms a preview image, the payment information as the aforesaid reorder data ROD is delivered between the user terminal 90 and the charging & settlement server 70, and thereby the charging processing is performed. In the print order receiving system, the order receiving server 80 generates the aforesaid re-receiving data RROD corresponding to the charging processing. By the supply of the re-receiving data RROD to the output receiving server 20, the order of the later printed matter is re-received. Then, in the print order receiving system, the image storing server 30 and the second print out apparatus 120 operate to generate the later printed matter PRL in response to a print instruction from the output receiving server 20. The later printed matter PRL is shipped to the user through the shipping terminal 50.

In the print order receiving system, the delivery of information is performed in such a way, and then the later printed matter PRL of the image data based on the captured image data PID reaches the user.

Figure 17:
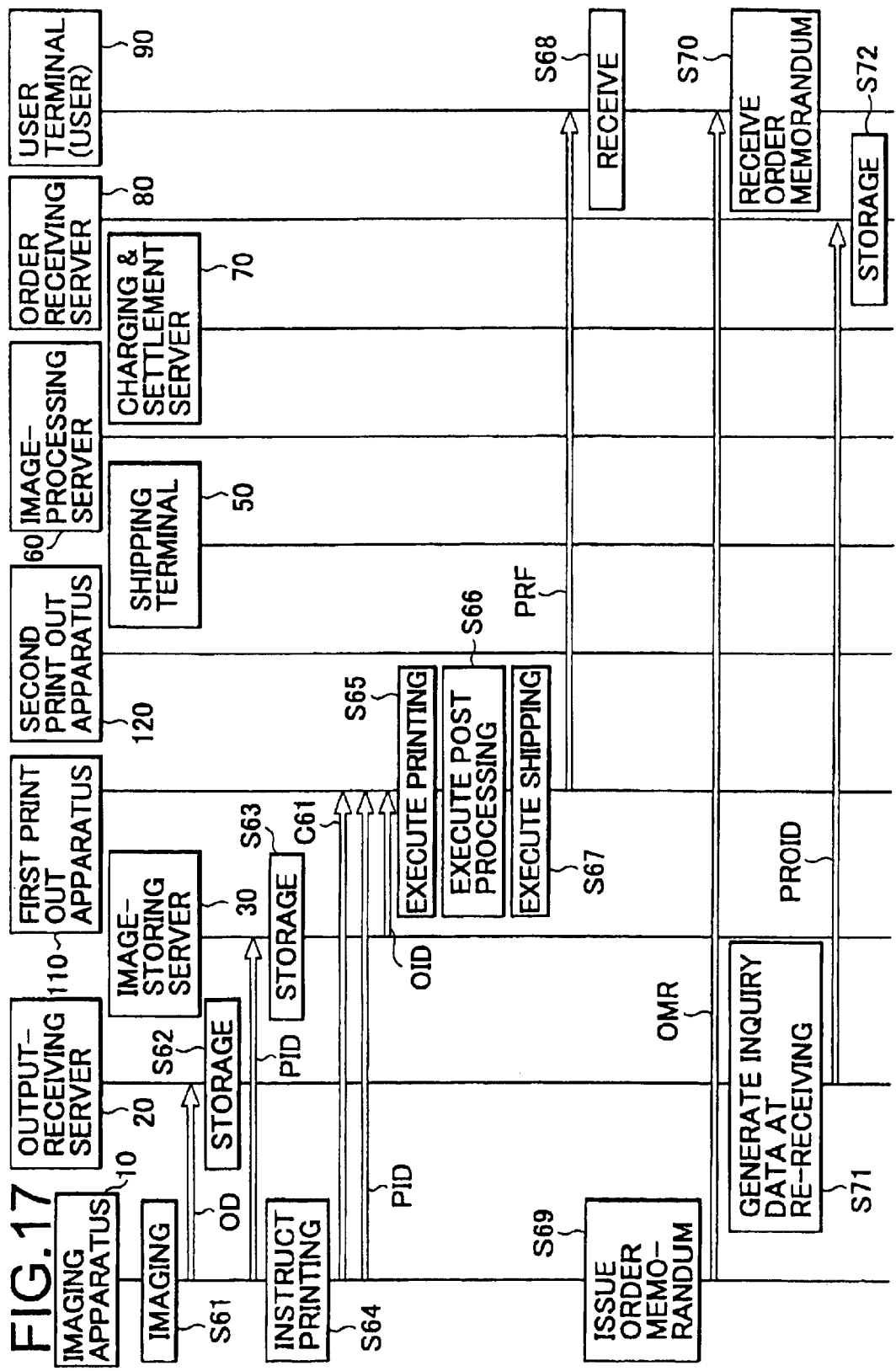
FIG. 17 is a diagram for illustrating a series of the processing processes in the print order receiving system, illustrating the process of ordering a print output of an image by imaging with the imaging apparatus.
Figure 18:
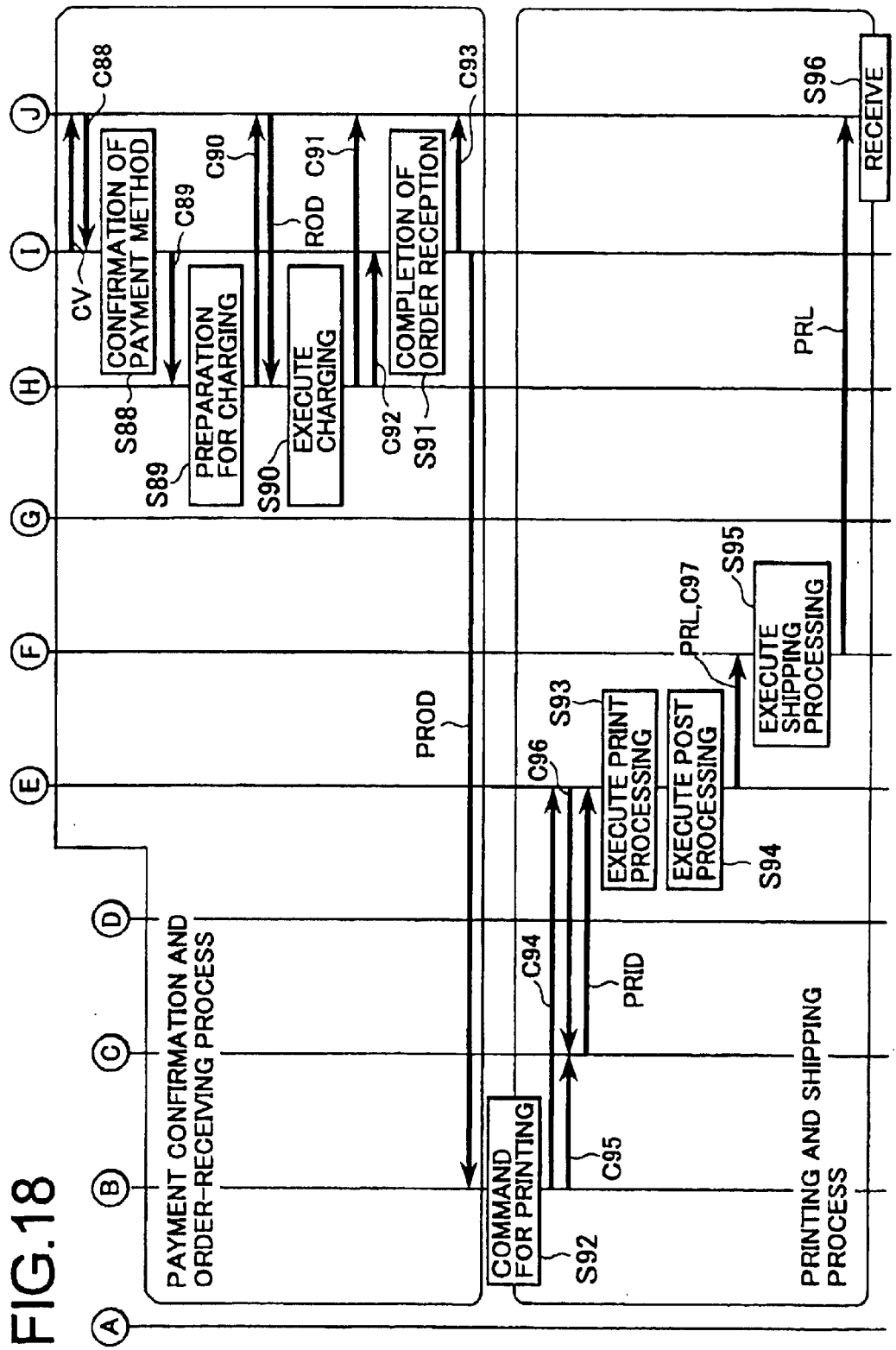
FIG. 18 is a diagram for illustrating a series of the processing processes in the print order receiving system, illustrating a connection and user inquiry process and a reception and received content confirmation process in the processes of reordering later printed matter on the basis of captured image data later.
Figure 19:
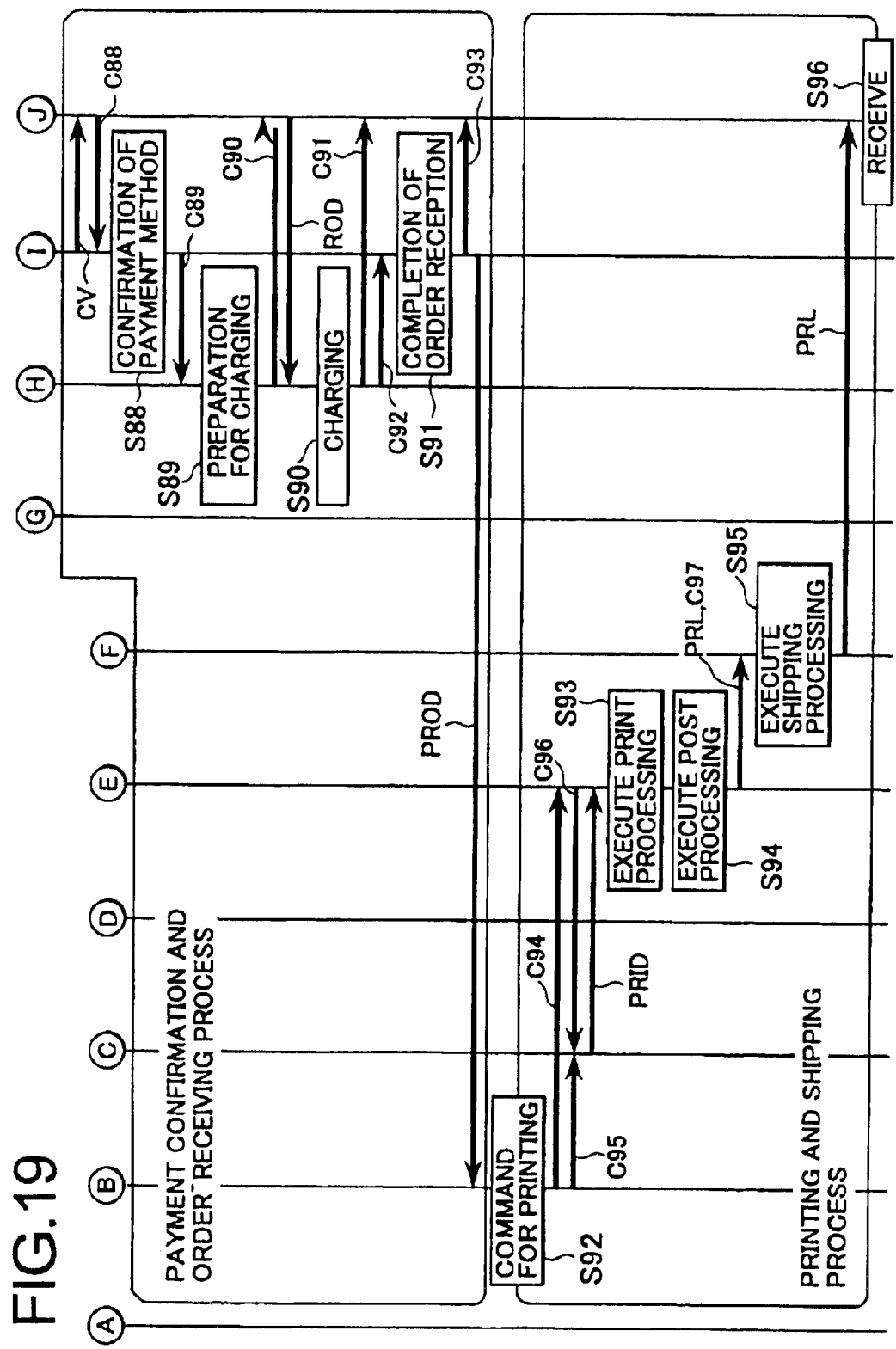
FIG. 19 is a diagram for illustrating a series of the processing processes in the print order receiving system, illustrating a payment confirmation and order receiving process and a printing and shipping process in the processes of reordering later printed matter on the basis of captured image data later.

In more concrete terms, the print order receiving system receives an order of a print output of a captured image data PID and a reorder of a print output of the image data based on the captured image data PID by performing a series of processing as shown in FIG. 17 to FIG. 19. In addition, in FIG. 14 to FIG. 19, too, the contents of the processing of each apparatus in the print order receiving system are shown, and the timing of the delivery of information between each apparatus is also shown. Moreover, in FIG. 14 to FIG. 19, as described above, white arrows indicate information delivered in a process for ordering a print output of an image by the imaging of the imaging apparatus 100, and black arrows indicate information to be delivered in a process for a later reorder based on a captured image data obtained by previous imaging. Moreover, the user terminal 90 in FIG. 14 to FIG. 19 may designate an actual user oneself.

By the imaging with the imaging apparatus 100 in the print order receiving system at first, the process for ordering a print output of an image is performed through a series of the processing as shown in FIG. 17.

In other words, in the print order receiving system, for example, when a user pays a fee against the imaging apparatus 100, as shown in FIG. 17, at step S61, the imaging apparatus 100 performs the imaging of an object. At this stage, in the print order receiving system, order data OD are generated by the imaging apparatus 100 to be supplied to the output receiving server 20. Moreover, in the print order receiving system, captured image data PID are supplied from the imaging apparatus 100 to the image storing server 30. With this, in the print order receiving system, at step S62, the order data OD are stored by the output receiving server 20. Moreover, in the print order receiving system, at step S63, the image storing server 30 stores the captured image data PID.

Next, in the print order receiving system, at step S64, the imaging apparatus 100 generates a print instruction control signal C61 for instructing the print of an image to supply the print instruction control signal C61 to the first print out apparatus 110. Moreover, in the print order receiving system, the imaging apparatus 100 supplies the captured image data PID to be printed to the first print out apparatus 110, and the image storing server 30 supplies image data OID such as the foreground image data and/or the background image data to the first print out apparatus 110.

Next, in the print order receiving system, at step S65, the first print out apparatus 110 performs the printing processing of the image data obtained by the execution of predetermined processing such as synthesis of the captured image data PID and the image data OID. Moreover, as the need arises, at step S66, the processing similar to the aforesaid processing at step S10.

Then, in the print order receiving system, at step S67, the first print out apparatus 110 discharges the generated initial printed matter PRF to the outside to execute predetermined delivery processing to the user. The user, at step S68, receives the outputted initial printed matter PRF on the spot.

Moreover, in the print order receiving system, at step S68, the imaging apparatus 100 issues an order memorandum OMR. The user or the user terminal 90, at step S70, receives the order memorandum OMR.

Next, in the print order receiving system, at step S71, the output receiving server 20 generates a reorder receiving inquiry data RROID to supply the generated reorder receiving inquiry data RROID to the order receiving server 80. As a result, in the print order receiving system, at step S72, the order receiving inquiry server 80 stores the reorder receiving inquiry data RROID, and the series of processing is terminated.

As described above, in the print order receiving system, a user can receive the initial printed matter PRF of the captured image data PID obtained by the imaging of the imaging apparatus 100.

On the other hand, in the print order receiving system, the process for reordering later printed matter PRL later on the basis of a captured image data PID is performed through a series of processing as shown in FIG. 18 and FIG. 19. Similarly to the process shown in FIG. 9 and FIG. 10, the process is roughly divided into four processes, i.e. a connection & user inquiry process, a reception and received content confirmation process, a payment confirmation and order receiving process, and a printing and shipping process.

At first, in the print order receiving system, as shown in FIG. 18, the connection & user inquiry process is performed. In the print order receiving system, at step S81, the user terminal 90 performs access processing to the order receiving server 80. The access processing is for example the following processing. In the print order receiving system, a connection requirement control signal C81 for requiring connection is supplied from the user terminal 90 to the order receiving server 80 in response to the access processing. Thereby, in the print order receiving system, when the connection is permitted, the aforesaid predetermined initial screen IV for reorder is downloaded from the order receiving server 80 to the user terminal 90 to be displayed on the not shown display of the user terminal 90.

Next, in the print order receiving system, the user requests a reorder by operating a selection button on an initial screen IV with an operation section. In the print order receiving system, the user terminal 90 supplies a reorder request control signal C82 for the request of a reorder to the order receiving server 80 in response to the request. As a result, in the print order receiving system, the order receiving server 80 supplies a request control signal C83 for requesting the upload of reorder data ROD of the user terminal 90. In the print order receiving system, at step S82, the reorder data ROD is generated by user's input of predetermined information with the operation section after the user's confirmation of the contents of the order memorandum OMR in response to the request. In the print order receiving system, the reorder data ROD is supplied from the user terminal 90 to the order receiving server 80.

Then, in the print order receiving system, at step S83, the order receiving server 80 inquires the user by inspecting the conformity between the reorder receiving inquiry data RROID and the reorder data ROD.

Next, in the print order receiving system, when the eligibility of a user is certified and the user's reorder is permitted, as the reception and received content confirmation, the aforesaid predetermined menu screen MV for a reorder is downloaded from the order receiving server 80 to the user terminal 90 to be displayed on the display of the user terminal 90. In the print order receiving system, a user issues a reorder by selecting desired image data to reorder in the menu displayed on the menu screen MV by operating a selection button for selecting the image data with the operating section. At that stage, the user can select desired foreground image data and/or desired background image data besides captured image data PID. In the print order receiving system, in response to the user's selection operation, an image data selection control signal C84 indicating the selected image data is supplied from the user terminal 90 to the order receiving server 80. Thereby, in the print order receiving system, at step S84, reception contents such as the selected image data and an ordered quantity are confirmed by the order receiving server 80.

In succession, in the print order receiving system, a preview display instruction control signal C85 for making the display of the user terminal 90 display a preview image on the basis of the selected image data is supplied from the order receiving server 80 to the image processing server 60. Thereby, in the print order receiving system, at step S85, the image processing server 60 performs the predetermined preparation processing for performing the display of a preview image to the user terminal 90. Then, in the print order receiving system, an image requirement control signal C86 indicating the requirement for the image data to be displayed as preview display is supplied from the image processing server 60 to the image storing server 30.

NextNext, in the print order receiving system, the aforesaid image data PVID are read from the image storing server 30 in response to the image requirement control signal C86 to be supplied to the image processing server 60. In the print order receiving system, at step S86, the image processing server 60 performs the predetermined image processing of the image data PVID to supply the processed image data PVID to the user terminal 90 as a preview image PVI. The preview image PVI is displayed on the display in the user terminal 90.

Then, in the print order receiving system, when the user confirms the preview image PVI and performs a predetermined operation indicating the decision of the reorder of later printed matter PRL having the same contents as the preview image PVI, the user terminal 90 supplies a confirmation control signal C87 indicating the confirmation and the order of the preview image PVI to the order receiving server 80. In the print order receiving system, at step S87, the order receiving server 80 confirms the final reception contents.

Next, in the print order receiving system, as shown in FIG. 19, as the payment confirmation and order receiving process, the aforesaid predetermined payment method screen CV is downloaded from the order receiving server 80 to the user terminal 90 to be displayed on the display of the user terminal 90. In the print order receiving system, a user selects a desired payment method in the menu displayed in the payment method screen CV and operates the selection button for the selection of the payment method with the operation section, and thereby a payment method control signal C88 is supplied from the user terminal 90 to the order receiving server 80. Then, in the print order receiving system, at step S88, the order receiving server 80 confirms the payment method, and a charging instruction control signal C89 instructing charging is supplied to the charging & settlement server 70.

Next, in the print order receiving system, at step S89, the charging & settlement server 70 performs predetermined preparation processing for executing charging processing, and the charging & settlement server 70 supplies a payment information requirement signal C90 for requiring the aforesaid payment information to the user terminal 90. As a result, in the print order receiving system, by the user's input of the predetermined payment information with the operation section of the user terminal 90, the payment information is generated as the aforesaid reorder data ROD by the user terminal 90 to be supplied to the charging & settlement server 70. In the print order receiving system, when the reorder data ROD are supplied from the user terminal 90 to the charging & settlement server 70, at step S90, the charging & settlement server 70 executes the charging processing.

Then, in the print order receiving system, a payment completion control signal C91 indicating the completion of the payment is supplied from the charging & settlement server 70 to the user terminal 90, and a charging completion control signal C92 indicating the completion of the charging processing is supplied from the charging & settlement server 70 to the order receiving server 80. In the print order receiving system, at step S91, the order receiving server 80 performs the processing for completing the reorder receiving to supply a reception completion control signal C93 indicating the completion of the reception to the user terminal 90, and further the aforesaid re-receiving data RROD are supplied from the order receiving server 80 to the output receiving server 20.

In succession, in the print order receiving system, as the printing and shipping process, at step S92, the output receiving server 20 generates a printing instruction control signal C94 for instructing the printing of an image to be supplied to the second print out apparatus 120. Moreover, in the print order receiving system, image requirement control signals C95 and C96 indicating the requirement of the image data to be printed are supplied from the output receiving server 20 and the second print out apparatus 120 to the image storing server 30. As a result, in the print order receiving system, image data PRID to be printed are read from the image storing server 30 in response to the image requirement control signals C95 and C96 to be supplied to the second print out apparatus 120.

Next, in the print order receiving system, at step S93, the second print out apparatus 120 performs the printing processing of the image data PRID, and further, at step S94, the second print out apparatus 120 performs the post processing of the printing similar to the aforesaid processing at step S10 as the need arises.

Then, in the print order receiving system, the second print out apparatus 120 supplies a print ending control signal C97 indicating the ending of the printing of an image together with the generated later printed matter PRL to the shipping terminal 50. As a result, in the print order receiving system, at step S95, the shipping terminal 50 performs predetermined shipping processing, and the later printed matter PRL is shipped to the user. The user, at step S96, receives the shipped later printed matter PRL, and the series of processing is terminated.

As described above, in the print order receiving system, a user can reorder and receive a later printed matter PRL of image data based on captured image data PID obtained by the imaging with the imaging apparatus 10.

As described above, the print order receiving system shown as the third embodiment of the present invention, similarly to the print order receiving system shown as the first embodiment, stores various kinds of information concerning ordering together with captured image data PID obtained by previous imaging, and supplies the stored information together with the captured image data PID through a network. Thereby, a user can reorder the later printed matter PRL of the image data based on the captured image data PID obtained by previous imaging. Moreover, the print order receiving system enables an business operator to establish the imaging apparatus 100 and the first print out apparatus 110 at a plurality of places and to establish various kinds of apparatus other than the imaging apparatus 100 and the first print out apparatus 110 intensively, which enables the business operator to increase the operation efficiency of the first print out apparatus 110 and the second print out apparatus 120, and to collect the expense of equipment in a short period. In particular, because the print order receiving system can deliver initial printed matter PRF obtained by imaging to a user on the spot, the facility of the system to the user and the amusing feature of the system are improved.

Next, a description is given to a fourth embodiment of the present invention. The print order receiving system has a configuration basically similar to that of the print order receiving system shown as the second embodiment. The print order receiving system of the forth embodiment differs from that of the first embodiment in delivering printed matter of captured image data obtained by imaging with imaging apparatus to a user on the spot similarly to the print order receiving system shown as the third embodiment. Accordingly, hereupon, each apparatus is designated by the same reference mark as that of the second embodiment, and the detailed description thereof is omitted.

Figure 20:
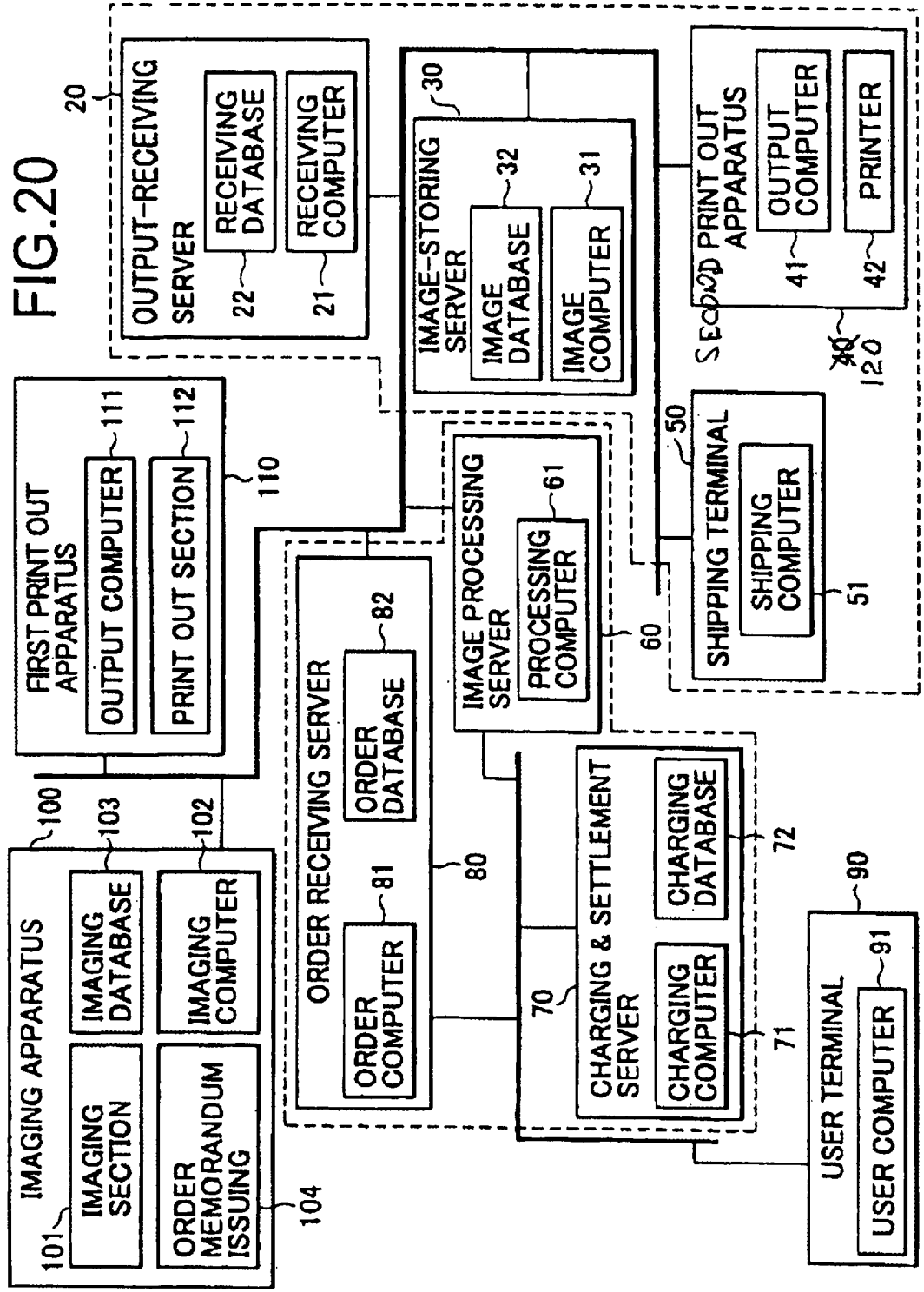
FIG. 20 is a bock diagram illustrating the configuration of a print order receiving system as a fourth embodiment of the invention.

The print order receiving system is, as shown in FIG. 20, equipped with an output receiving server 20, an image storing server 30, a shipping terminal 50, an image processing server 60, a charging & settlement server 70, an order receiving server 80, user terminals 90, imaging apparatus 100, first print out apparatus 110 and a second print out apparatus 120.

In the print order receiving system, a network connecting the user terminals 90 with the image processing server 60, the charging & settlement server 70 and the order receiving server 80 is one such as the Internet. A network connecting the output receiving server 20, the image storing server 30, the shipping terminal 50, the image processing server 60, the order receiving server 80 and the second print out apparatus 120 and a network connecting the imaging apparatus 100 and the first print out apparatus 110 and the second print out apparatus 120 are one such as intranet. Then, in the print order receiving system, the imaging apparatus 100 and the first print out apparatus 110 are connected with the network and disposed at a plurality of locations. A plurality of user terminals 90 is connected with the network connecting the image processing server 60, the charging & settlement server 70 and the order receiving server 80.

Each of the imaging apparatus 100, as described above, includes an imaging section 101, an image computer 102, an imaging database 103 and an order memorandum issuing 104.

The imaging section 101, as described above, images an object and a background and the like as the need arises under the control of the imaging computer 102.

The image computer 102 performs the control of the imaging section 101 at the event of imaging, and supplies captured image data obtained by the imaging of the imaging section 101 not to the image storing server 30 but to the order receiving server 80. Moreover, the image computer 102 supplies the generated various kinds of information concerning imaging to the imaging database 103, and supplies the information not to the output receiving server 20 but to the order receiving server 80 as order data. Moreover, the image computer 102, as described above, generates a print instruction control signal for instructing the printing of an image to supply the generated print instruction control signal to the first print out apparatus 110. The image computer 102 also supplies the captured image data obtained by the imaging of the imaging section 101 to the first print out apparatus 110. Furthermore, the image computer 102, as described above, controls the order memorandum issuing 104 to make it issue an order memorandum.

The imaging database 103, as described above, stores various kinds of information concerning imaging, the information being generated by the image computer 102, as a database. The various kinds of information that concern the imaging and are to be stored in the imaging database 103 are the same as ones shown in FIG. 2 previously.

The order memorandum issuing 104, as described above, issues at least the aforesaid "Image number (Order Number)" and "Password" as an order memorandum under the control of the image computer 102. It is needless to say that, in the print order receiving system, as described above, an order memorandum issued by the order memorandum issuing 104 may be delivered to a user on the spot as printed matter, or the order memorandum may be delivered to the user by the transmission of the order memorandum to the user terminal 90 through a predetermined provider.

Each of such imaging apparatus 100 images at least an object by the user's payment of a rental fee in, for example, coins, and the imaging apparatus 100 generates the information concerning the imaging together with captured image data. The imaging apparatus 100 controls the first print out apparatus 110 to make the first print out apparatus 110 output printed matter.

The output receiving server 20, as described above, includes a receiving computer 21 and a receiving database 22.

The receiving computer 21 generates the various kinds of information concerning order receiving on the basis of the order data supplied not from the imaging apparatus 100 but from the order receiving apparatus 80, and the receiving computer 21 supplies the generated information to the receiving database 22. Now, the receiving computer 21 does not generate the aforesaid reorder receiving inquiry data. Moreover, the receiving computer 21, as described above, receives re-receiving data from the order receiving server 80 at the event of receiving a reorder. Then, the receiving computer 21 generates the various kinds of information concerning order receiving on the basis of the received re-receiving data to supply the generated information to the receiving database 22. Moreover, the receiving computer 21, as described above, generates a print instruction control signal for instructing the printing of an image. The receiving computer 21 supplies the generated print instruction control signal to the second print out apparatus 120, and further the receiving computer 21 supplies an image requirement control signal indicating the requirement of image data to be printed to the image storing server 30.

The receiving database 22, as described above, stores the various kinds of information that concern order receiving and were generated by the receiving computer 21 as a database. The various kinds of information that concern order receiving and are to be stored in the receiving database 22 are the same as ones shown in FIG. 3 previously. However, the various kinds of information concerning order receiving were generated by the receiving computer 21 on the basis of the order data and the re-receiving data, both being supplied from the order receiving server 80.

This output receiving server 20 performs the whole processing concerning the order receiving of a print out of an image, and generates the information concerning each order receiving.

The image storing server 30, as described above, includes an image computer 31 and an image database 32.

The image computer 31, as described above, receives the captured image data stored in the order receiving server 80 temporarily, and the image computer 31 makes the image database 32 store the received captured image data. Moreover, the image computer 31, as described above, makes the image database 32 store various kinds of image data besides the captured image data. Moreover, the image computer 31, as described above, generates various kinds of information concerning the stored image data corresponding to the image data. The image computer 31 supplies the generated information to the image database 32 for making the image database 32 store the supplied information. Furthermore, the image computer 31, as described above, reads the image data from the image database 32 from which image data are required corresponding to an image requirement control signal supplied from the image processing server 60. The image computer 31 supplies the read image data to the image processing server 60. Furthermore, the image computer 31, as described above, reads the image data from the image database 32 which image data were required corresponding to the image requirement control signal supplied from the output receiving server 20 and the second print out apparatus 120. The image computer 31 supplies the read image data to the second print out apparatus 120.

The image database 32, as described above, stores various kinds of image data under the control of the image computer 31, and stores various kinds of information that concern image data and are generated by the image computer 31 as a database. The various kinds of information that concern the image data and are stored in the image database 32 are the same ones as shown in FIG. 4 previously.

This image storing server 30 stores various kinds of image data, and generates the information concerning image data.

The first print out apparatus 110, as described above, includes an output computer 111 and a print output 112.

As described above, when a printing instruction control signal instructing the printing of an image is supplied to the output computer 111 from the imaging apparatus 100, the output computer 111 makes the print output 112 print the image data generated by the predetermined image processing such as the synthesis of the captured image data supplied from the imaging apparatus 100 and the desired image data supplied from the image storing server 30.

The print output 112, as described above, prints an image under the control of the output computer 111 to discharge it as printed matter to the outside. The printed matter is delivered to a user as it is.

This first print out apparatus 110 prints the designated image, and generates printed matter to deliver it to a user.

The second print out apparatus 120, as described above, includes an output computer 121 and a print output 122.

As described above, when a printing instruction control signal for instructing the printing of an image is supplied to the output computer 121 from the output receiving server 20, the output computer 121 supplies an image requirement control signal indicating the requirement of the image data to be printed to the image storing server 30. Then, the output computer 121 makes the print output 122 print the image data read corresponding to the image requirement control signal. And then, when the printing ends, the output computer 121 supplies a print ending control signal indicating the end of the printing of an image to the shipping terminal 50 together with generated printed matter.

The print output 122, as described above, prints an image under the control of the output computer 121 to discharge it as printed matter to the outside. The printed matter is supplied to the shipping terminal 50 by the output computer 121.

This second print out apparatus 120 prints the designated image, and generates printed matter as final shipping goods.

The shipping terminal 50, as described above, includes a shipping computer 51.

As described above, when a print ending control signal indicating the end of the printing of an image is supplied to the shipping computer 51 from the second print out apparatus 120, the shipping computer 51 performs various kinds of processing for the preparation for shipment. When the preparation for the shipping by the shipping computer 51 is completed, the printed matter is shipped. The shipping computer 51 generates shipping information indicating the shipping of the printed matter, and records the information in, for example, a hard disk drive or the like, or displays the information on a display.

This shipping terminal 50 performs various kinds of processing such as the generation of various kinds of information necessary for the shipping of printed matter to a user being a right addressee.

The image processing server 60, as described above, includes a processing computer 61.

As described above, when a preview display instruction control signal for instructing the not shown display of the user terminal 90 to display an image is supplied to the processing computer 61 from the order receiving server 80, the processing computer 61 supplies an image requirement control signal indicating the requirement of the image data to be displayed to the image storing server 30. Then, the processing computer 61, as described above, processes the image data that were read in response to the image requirement control signal as the need arises, and the processing computer 61 supplies the read image data to the user terminal 90 as a preview image to make the displaying of the preview image.

This image processing server 60 processes image data to generate a preview image for displaying an image similar to the printed matter.

The charging & settlement server 70, as described above, includes a charging computer 71 and a charging database 72.

As described above, when a charging instruction control signal for instructing charging is supplied to the charging computer 71 from the order receiving server 80, the charging computer 71 requires payment information, which is the information concerning a payment method necessary for the payment of charge, of the user terminal 90. Then, when the charging computer 71, as described above, receives the payment information from the user terminal 90 as reorder data, the charging computer 71 executes its charging processing. And then, the charging computer 71 supplies a payment completion control signal indicating the completion of payment to the user terminal 90. Moreover, the charging computer 71 supplies a charging completion control signal indicating the completion of the charging processing to the order receiving server 80. The charging computer 71 generates various kinds of information concerning the charging and the settlement at the event of the processing to make the charging database 72 store the information.

The charging database 72, as described above, stores the various kinds of information that concern charging and settlement and are generated by the charging computer 71 as a database. The various kinds of information to be stored in the charging database 71 are the same as ones shown in FIG. 5 previously.

This charging & settlement server 70 carries the whole processing concerning charging and settlement, and generates information concerning charging and settlement.

The order receiving server 80, as described above, includes an order computer 81 and an order database 82.

As described above, when order data generated by the imaging apparatus 100 are supplied to the order computer 81, the order computer 81 makes the order database 82 store the order data, and generates various kinds of information concerning the receiving of an order on the basis of the order data. The order computer 81 supplies the generated information to the order database 82. Moreover, when captured image data are supplied to the order computer 81 from the imaging apparatus 100, the order computer 81 supplies the captured image data to the order database 82, and makes the order database 82 store the captured image data temporarily. After that, the order computer 81 supplies the stored captured image data to the image storing server 30. Furthermore, the order computer 81 supplies received order data indicating the contents of the order to the output receiving server 20.

Then, when a connection requirement is issued from the user terminal 90 to the order computer 81, the order computer 81 performs the same processing as one described above. In other words, the order computer 81 makes a not shown display of the user terminal 90 display a predetermined initial screen for reordering. When various kinds of information indicating reordered contents are supplied to the order computer 81 from the user terminal 90 as reorder data, the order computer 81 performs various kinds of processing concerning reordering on the basis of the reorder data. To put it specifically, the order computer 81 performs user inquiry by inspecting the conformity between the order data and the reorder data when a requirement of a reorder is transmitted from the user terminal 90. When the user is an eligible person as a result of the inquiring, the order computer 81 makes the displaying of a predetermined menu screen for reordering on the display screen of the user terminal 90. According to a selection operation of the user terminal 90 with the menu screen, the order computer 81 supplies the aforesaid preview display instruction control signal for making the display of the user terminal 90 display a preview image to the image processing server 60. Then, when a confirmation control signal indicating an order after the confirmation of the preview image is supplied to the order computer 81 from the user terminal 90, the order computer 81 makes the display of the user terminal 90 display a predetermined payment method screen concerning the payment of a charge. In response to a selection operation of the user terminal 90 with the payment method screen, the order computer 81 supplies the aforesaid charging instruction control signal instructing charging to the charging & settlement server 70. Moreover, when the aforesaid charging completion control signal indicating the completion of charging processing is supplied to the order computer 81 from the charging & settlement server 70, the order computer 81 supplies a reception completion control signal indicating the completion of the reception of the reorder to the user terminal 90, and further the order computer 81 supplies the aforesaid re-receiving data indicating the contents of the reorder to the output receiving server 20. The order computer 81 generates the information concerning the reorder as the aforesaid various kinds of information concerning the reception of the order, and the information is supplied to the order database 82.

The order database 82, as described above, temporarily stores the captured image data and stores various kinds of information that were generated by the order computer 81 and concern the reception of an order as a database under the control of the order computer 81. The various kinds of information that are to be stored in the order database 82 and concern the reception of an order are the same as those shown in FIG. 6 previously. The information further includes ordered prices of captured image data themselves which prices were obtained by the imaging of the imaging apparatus 100.

This order receiving server 80 receives orders including reorders of images and generates the information concerning the reception of the orders.

The user terminal 90, as described above, includes a user computer 91.

The user computer 91 performs the procedures such as the display of a preview image or payment by performing the processing similar to the aforesaid one through a predetermined provider at the event of performing a reorder of an image.

This user terminal 90 works as a user interface at the event of reordering, and the user terminal 90 is also a communication terminal enabling a user to perform the delivery of information to a business operator through a network.

Figure 21:
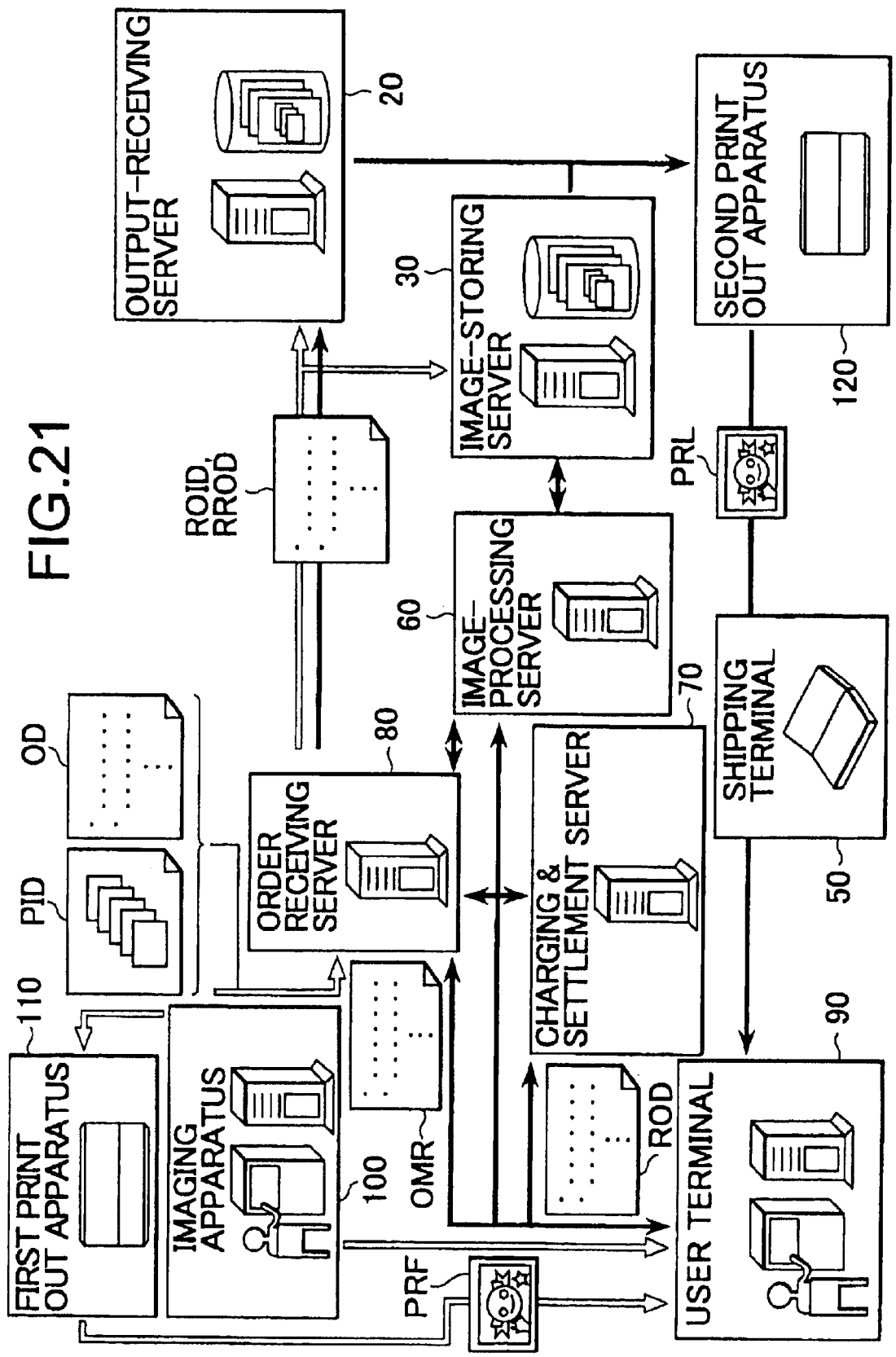
FIG. 21 is a diagram for illustrating information handed over between each apparatus in the print order receiving system.

Now, the print order receiving system composed of each apparatus like this performs the delivery of information between each apparatus as shown in FIG. 21, and receives an order of a print output of an image. In FIG. 21, white arrows indicate information delivered in a process for ordering a print output of an image by the imaging of the imaging apparatus 100, and black arrows indicate information to be delivered in a process for a later reorder based on a captured image data obtained by previous imaging. Moreover, in the following, a printed matter shipped in the process indicated by the white arrows is called as "initial printed matter", and a printed matter in the process indicated by the black arrows is called as "later printed matter" as the need arises.

In the print order receiving system, when a user first performs the imaging with the imaging apparatus 100 by paying a rental fee, for example, in coins or the like, the captured image data PID generated by the imaging of the imaging apparatus 100 are supplied to the first print out apparatus 110. Then, in the print order receiving system, when the order of the print output of the captured image data PID is received in such a way, the first print out apparatus 110 is operated in response to a printing instruction from the imaging apparatus 100. The initial printed matter PRF generated by the first print out apparatus 110 is delivered to a user on the spot. Moreover, in the print order receiving system, the aforesaid order memorandum OMR is directly delivered to a user, or the order memorandum OMR is delivered to the user through the user terminal 90. Moreover, in the print order receiving system, the aforesaid order data OD generated by the imaging apparatus 100 and the captured image data PID obtained by the imaging of the imaging apparatus 100 are both supplied to the order receiving server 80. Then in the print order receiving system, the captured image data stored in the order receiving server 80 temporarily are supplied to the image storing server 30. Moreover, the print order receiving system, the order receiving server 80 generates the aforesaid ordered data RODD to supply the generated ordered data RODD to the output receiving server 20.

In the print order receiving system, the delivery of information is performed in such way as described above, and then the initial printed mater PRF of the captured imaged data PID reaches the user.

Moreover, in the print order receiving system, when a reorder of later printed matter of image data based on the captured image data PID is performed, a user accesses the order receiving server 80 with the user terminal 90 at first. Then, the user transmits reorder data ROD to the order receiving server 80 with the user terminal 90.

In the print order receiving system, when the later printed matter of the image data based on the captured image data PID is ordered in such a way, the image processing server 60 reads the captured image data PID, foreground image data and/or background image data, all being designated by the image storing server 30, and predetermined image processing is performed to the read image data. The image data obtained as a result of the processing are downloaded to the user terminal 90 as a preview image, and are displayed on the display of the user terminal 90. In the print order receiving system, when a user confirms a preview image, the payment information as the aforesaid reorder data ROD is delivered between the user terminal 90 and the charging & settlement server 70, and thereby the charging processing is performed. In the print order receiving system, the order receiving server 80 generates the aforesaid re-receiving data RROD corresponding to the charging processing. By the supply of the re-receiving data RROD to the output receiving server 20, the order of the later printed matter is re-received. Then, in the print order receiving system, the image storing server 30 and the second print out apparatus 120 operate to generate the later printed matter PRL in response to a print instruction from the output receiving server 20. The later printed matter PRL is shipped to the user through the shipping terminal 50.

In the print order receiving system, by delivering information in such way as described above, the later printed matter PRL of the image data based on the captured image data PID reaches the user.

In more specific terms, the print order receiving system receives an order of a print output of a captured image data PID by performing a series of processing as shown in FIG. 22, and receives a reorder of print output of the image data based on the captured image data PID by performing the processing similar to that shown in FIG. 18 and FIG. 19 previously. In addition, in FIG. 22 too, the contents of the processing of each apparatus in the print order receiving system are shown, and the timing of the delivery of information between each apparatus is also indicated. Moreover, the user terminal 90 in FIG. 22 may designate an actual user oneself.

In other words, by the imaging with the imaging apparatus 100 in the print order receiving system, as the process for ordering a print output of an image, for example, when a user pays a fee against the imaging apparatus 100, as shown in FIG. 22, at step S101, the imaging apparatus 100 performs the imaging of an object.

Next, in the print order receiving system, at step S102, the imaging apparatus 100 generates a print instruction control signal C101 for instructing the print of an image to supply the print instruction control signal C101 to the first print out apparatus 110. Moreover, in the print order receiving system, the imaging apparatus 100 supplies the captured image data PID to be printed to the first print out apparatus 110, and the image storing server 30 supplies image data OID such as the foreground image data and/or the background image data to the first print out apparatus 110.

Next, in the print order receiving system, at step S103, the first print out apparatus 110 performs the printing processing of the image data obtained by the execution of predetermined processing such as synthesis of the captured image data PID and the image data OID. Moreover, as the need arises, at step S104, the processing similar to the aforesaid processing at step S10.

Then, in the print order receiving system, at step S105, the first print out apparatus 110 outputs the generated initial printed matter PRF in order to execute a predetermined delivery processing to the user. The user, at step S106, receives the outputted initial printed matter PRF on the spot.

Moreover, in the print order receiving system, at step S107, the imaging apparatus 100 issues an order memorandum OMR. The user or the user terminal 90, at step S108, receives the order memorandum OMR.

Next, in the print order receiving system, the imaging apparatus 100 generates an order data OD in order to supply the generated order data OD to the order receiving server 80. Moreover, in the print order receiving system, the imaging apparatus 100 supplies captured image data PID to the order receiving server 80. As a result, in the print order receiving system, at step S109, the order receiving server 80 store order data OD, and at step S110, the order receiving server 80 temporarily stores the captured image data PID.

Next, in the print order receiving system, the order receiving server 80 supplies the captured image data PID to the image storing server 30. As a result, in the print order receiving system, at step S111, the image storing server 30 stores the capture image data PID. Moreover, in the print order receiving system, the order receiving server 80 supplies the ordered data RODD to the output receiving server 20. As a result, in the print order receiving system, at step S112, the output receiving server 20 stores the ordered data RODD. Thus, the series of processing is completed.

As described above, in the print order receiving system, a user can receive the initial printed matter PRF of the captured image data PID obtained by the imaging with the imaging apparatus 100 on the spot. In addition, in the print order receiving system, the process for reordering later printed matter PRL based on the captured image data PID later is performed through a series of processing like the processing shown in FIG. 18 and FIG. 19 previously.

As described above, the print order receiving system shown as the fourth embodiment of the present invention, similarly to the print order receiving system shown as the second embodiment, stores various kinds of information concerning ordering together with captured image data PID obtained by previous imaging, and supplies the stored information together with the captured image data PID through a network. Thereby, a user can reorder the later printed matter PRL of the image data based on the captured image data PID obtained by previous imaging. Moreover, the print order receiving system enables an business operator to establish the imaging apparatus 100 and the first print out apparatus 110 at a plurality of places and to establish various kinds of apparatus other than the imaging apparatus 100 and the first print out apparatus 110 intensively, which enables the business operator to increase the operation efficiency of the first print out apparatus 110 and the second print out apparatus 120, and to collect the expense of equipment in a short period. In particular, because the print order receiving system intensively receives the order at first and a reorder with the order receiving server 80, the system can generate The same database both at the order at first and at the reorder. Consequently, the simplification of processing can be attained. Moreover, because the system can deliver initial printed matter PRF obtained by imaging to a user on the spot, the convenience of the system to the user and the amusing feature of the system are improved.

As described above, the print order receiving system shown as the embodiment of the present invention stores various kinds of information concerning orders along with captured image data obtained by previous imaging. Consequently, a user can easily reorder printed matter of image data based on captured image data obtained by previous imaging through a network. Hence, the print order receiving system can meet a request of a user even in a case in which, for example, a plurality of sheets of the same printed matter are needed later and in a case in which a plural sheets of printed matter in which only the foregrounds and/or the backgrounds are changed. In particular, the print order receiving system is effective in a case in which a printed matter is produced by the imaging of a parallax image. By imaging a parallax image only once, the same printed matter or the similar printed matter in which the foreground and/or the background has been changed can be reordered.

On the other hand, because the print order receiving system can realize a sales form of reordering through a network, a business operator is not required to increase the number of systems to increase sales. Moreover, because the system can be put together at few places, the initial fee concerning the manufacturing the equipment of the system can be reduced. Moreover, the print order receiving system can increase the operation efficiency thereof by collection of the establishment places thereof. Thereby it is possible to secure many users for a unit time. Consequently, the costs of the equipment can be recovered in short term. Furthermore, it is also possible to supply a series of services to a user in a cheaply fashion.

In addition, the present invention is not limited to the aforesaid preferred embodiments, so that many other combinations and sub combinations thereof are allowable. For example, the present invention may be a combination of the first embodiment and the third embodiment, or a combination of the second embodiment and the fourth embodiment.

More specifically, in the print order receiving system, the form of shipping of initial printed matter after imaging can be changed by providing a function of selection of the reception form of initial printed matter at the event of user's imaging with an imaging apparatus among two choices. One choice is that the user receives the initial printed matter obtained by the imaging later like in the first embodiment and the second embodiment. The other choice is that the user receives the initial printed matter on the spot after the imaging like in the third embodiment and the fourth embodiment.

Moreover, the print order receiving system may have a mode of receiving initial printed matter of two grades of image quality. A first grade would be, for example, a low resolution image quality, the so-called replica, in the case in which the initial printed matter is delivered to a user on the spot after imaging like in the third embodiment and in the fourth embodiment. A second grade would be, for example, a high resolution image quality in the case in which the initial printed matter is reordered later after user's confirmation of the initial printed matter like in the first embodiment and in the second embodiment. In such case, because the print order receiving system can set the price of the initial printed matter delivered to a user first to be more affordable, the system can provide a series of services under affordable price, and thereby the convenience of the system in relation to a user can be improved.

Although the invention has been described in its preferred form with a certain degree of particularity, obviously many changes, variations and combinations are possible therein. It is therefore to be understood that any modifications will be practiced otherwise than as specifically described herein without departing from the scope of the present invention.

What is claimed is:

1. A print order receiving system, said system comprising:
   a plurality of imaging apparatuses for imaging an object;
   a second order receiving apparatus connected with said plurality of imaging apparatuses through a first network, said second order receiving apparatus being supplied with captured image data obtained by imaging of the object from each of said plurality of imaging apparatuses through the first network, said second order receiving apparatus receiving an order of a print-out of each of the captured image data, said second order receiving apparatus stores the captured image data for each order;
   an image storing apparatus connected with said second order receiving apparatus through a second network that is different from the first network, said image storing apparatus storing image data including the captured image data supplied from said second order receiving apparatus through the second network;
   a first order receiving apparatus connected with said second order receiving apparatus through the second network, said first order receiving apparatus receiving an order of the print-out for captured image data stored in said second order receiving apparatus;
   a first print-out apparatus connected with said plurality of imaging apparatuses through the second network, said print-out apparatus printing the captured image data supplied from said imaging apparatus through the second network and the image data supplied from said image storing apparatus through the second network to output initial printed matter;
   a plurality of communication terminals for executing a reorder of later printed matter being printed matter of image data based on the captured image data through the first network;
   a charging and settlement apparatus connected with said plurality of communication terminals through the first network, said charging and settlement apparatus executing charging and settlement of the reordered later printed matter;

a second print-out apparatus different from said first print-out apparatus, said second print-out apparatus being connected with said second order receiving apparatus through the second network, said second print-out apparatus being supplied with the reordered image data based on the captured image data through the second network from said image storing apparatus according to re-receiving of a reorder of the print-out of the image data based on the captured image data by said first order receiving apparatus, said second print-out apparatus printing the supplied image data to output the later printed matter; and a shipping terminal connected with said second order receiving apparatus through the second network, said shipping terminal executing shipping processing of the later printed matter in correspondence with each of the captured image data, wherein:

said second order receiving apparatus is connected with said plurality of communication terminals through the first network and receives the reorder of later printed matter required by each of said plurality of communication terminals; and said first order receiving apparatus re-receives through the second network the print-out of the image data based on the captured image data reordered by said communication terminals to said second order receiving apparatus through the first network, according to execution of the charging and settlement by said charging and settlement apparatus.

2. A method for receiving an order for image printing, said method comprising the steps of:

imaging objects by a plurality of imaging apparatuses;

printing captured image data supplied from said imaging apparatus through the first network and the image data supplied from said image storing apparatus through the first network to output initial printed matter by a first print-out apparatus connected with said plurality of imaging apparatuses through the first network;

supplying the captured image data from each of the plurality of imaging apparatuses through the first network, the captured image data having been obtained by imaging of the object by each of said plurality of imaging apparatuses;

receiving an order of a print-out by a second order receiving apparatus for captured image data, said second order receiving apparatus being connected with said plurality of imaging apparatuses through a second network that is different from the first network;

storing the captured image data of each order by said second order receiving apparatus;

storing image data including the captured image data supplied from said second order receiving apparatus through the first network by an image storing apparatus connected with said second order receiving apparatus through the first network;

receiving an order of the print-out for the captured image data stored in said second order receiving apparatus by a first order receiving apparatus connected with said second order receiving apparatus through the first network, wherein the initial printed matter output from said first print out apparatus is one of hologram and parallax image printed matter, and the captured image data obtained by said plurality of imaging apparatuses is used for said hologram or parallax image printed matter;

reordering later printed matter being printed matter of image data based on the captured image data through the second network by a plurality of communication terminals;

receiving a reorder of the later printed matter, the reorder being issued from each of said plurality of communication terminals, by said second order receiving apparatus connected with said plurality of communication terminals through the second network;

charging and settling the reordered later printed matter by a charging and settlement apparatus connected with said plurality of communication terminals through the second network;

re-receiving a reorder of a print-out of the image data based on the captured image data through the first network by said first order receiving apparatus, the print-out being reordered by said communication terminals to said second order receiving apparatus through the second network, in response to the execution of the charging and the settlement by said charging and settlement apparatus;

supplying the reordered image data based on the captured image data from said image storing apparatus to a second print-out apparatus different from the first print-out apparatus through the first network in response to the re-receiving of the reordered print-out of the image data based on the reordered captured image data by said first order receiving apparatus;

printing the image data supplied from said image storing apparatus by said second print-out apparatus to output the later printed matter; and shipping the later printed matter by a shipping terminal in correspondence with each captured image data, said shipping terminal being connected with said second order receiving apparatus through the first network.

* * * * *